US012079788B2

(12) United States Patent
Smith et al.

(10) Patent No.: US 12,079,788 B2
(45) Date of Patent: *Sep. 3, 2024

(54) SYSTEM AND METHOD FOR INSTANT ISSUE OF PERSONALIZED FINANCIAL TRANSACTION CARDS

(71) Applicant: CPI CARD GROUP-TENNESSEE, INC., Nashville, TN (US)

(72) Inventors: Bobby Smith, Antioch, TN (US); James White, Murfreesboro, TN (US)

(73) Assignee: CPI CARD GROUP—TENNESSEE, INC., Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,033

(22) Filed: Apr. 25, 2023

(65) Prior Publication Data

US 2023/0259905 A1  Aug. 17, 2023

Related U.S. Application Data

(60) Division of application No. 16/951,524, filed on Nov. 18, 2020, now Pat. No. 11,687,894, which is a
(Continued)

(51) Int. Cl.
*G06Q 40/02* (2023.01)
*G06Q 20/10* (2012.01)
*G06Q 20/40* (2012.01)

(52) U.S. Cl.
CPC ....... *G06Q 20/105* (2013.01); *G06Q 20/4012* (2013.01); *G06Q 40/02* (2013.01)

(58) Field of Classification Search
CPC ... G06Q 20/105; G06Q 20/4012; G06Q 40/02
(Continued)

(56) References Cited

U.S. PATENT DOCUMENTS 4,755,940 A * 7/1988 Brachtl ................ G06Q 20/341
705/72
4,924,514 A * 5/1990 Matyas ............... G06F 9/30007
705/72
(Continued)

FOREIGN PATENT DOCUMENTS

| JP | 2003203207 A | 7/2003 |
|---|---|---|
| JP | 2004013541 A | 1/2004 |
| WO | 2006/056826 A1 | 6/2006 |

OTHER PUBLICATIONS

Dynamic Card Solutions Partners with Mountain America Credit Union to Offer Instant Issuance Throughout Utah Anonymous Business Wire p. 1 May 22, 2006 (Year: 2006).*
(Continued)

*Primary Examiner* — William E Rankins
(74) *Attorney, Agent, or Firm* — Dorsey & Whitney LLP

(57) ABSTRACT

A method for issuing a personalized financial transaction card including receiving customer information and card information from a customer at the branch location, the card information including a card PIN, inputting the customer information and at least some the card information into a data processing terminal at the branch, communicating the customer information and the card information across a network to a card services provider, entering the PIN into a PIN database, generating a reference number, storing the reference number and at least some of the customer data and card data in a card file, retrieving the PIN from the PIN database, using the retrieved PIN to apply calculations to the card file, securely sending the card file from the card services provider across the network to the branch location, and using information from the card file, printing the financial transaction card for the customer at the branch location.

20 Claims, 36 Drawing Sheets

Related U.S. Application Data continuation of application No. 16/373,321, filed on Apr. 2, 2019, now Pat. No. 10,846,666, which is a continuation of application No. 15/014,757, filed on Feb. 3, 2016, now Pat. No. 10,275,747, which is a continuation of application No. 13/867,678, filed on Apr. 22, 2013, now abandoned, which is a continuation of application No. 13/186,302, filed on Jul. 19, 2011, now Pat. No. 8,429,075.

(60) Provisional application No. 61/365,673, filed on Jul. 19, 2010.

(58) Field of Classification Search
USPC .................................................. 705/35, 41
See application file for complete search history.

(56) References Cited

U.S. PATENT DOCUMENTS

| | | | |
|---|---|---|---|
| 5,757,431 A | 5/1998 | Bradley et al. | |
| 5,883,452 A | 3/1999 | Masuda | |
| 5,984,181 A | 11/1999 | Kreft | |
| 6,144,948 A | 11/2000 | Walker et al. | |
| 6,493,671 B1 | 12/2002 | Ladd et al. | |
| 6,578,761 B1 | 6/2003 | Spector | |
| 6,786,418 B1 | 9/2004 | Francois | |
| 6,845,365 B2 | 1/2005 | Von et al. | |
| 6,877,656 B1 | 4/2005 | Jaros et al. | |
| 7,131,583 B2 | 11/2006 | Jaros et al. | |
| 7,191,939 B2 | 3/2007 | Beck et al. | |
| 7,302,719 B2 | 12/2007 | Jaros et al. | |
| 7,806,338 B1 | 10/2010 | Behner et al. | |
| 7,984,851 B2 * | 7/2011 | MacGuire | G06Q 20/105 235/382 |
| 8,061,596 B2 * | 11/2011 | Hogg | G06Q 20/04 705/41 |
| 2003/0210696 A1 * | 11/2003 | Goldflam | H04L 49/25 370/395.1 |
| 2004/0186925 A1 | 9/2004 | Cooper et al. | |
| 2005/0149739 A1 * | 7/2005 | Hopkins | H04L 9/0894 713/184 |
| 2005/0240994 A1 | 10/2005 | Burcham et al. | |
| 2006/0101262 A1 * | 5/2006 | Haney | H04L 45/04 713/153 |
| 2007/0282756 A1 * | 12/2007 | Dravenstott | G06Q 20/40 705/72 |
| 2009/0048970 A1 * | 2/2009 | Muscato | G06Q 20/24 705/40 |
| 2009/0055323 A1 * | 2/2009 | Rebidue | G06Q 20/3672 705/41 |
| 2010/0123002 A1 * | 5/2010 | Caporicci | G06Q 20/28 235/380 |
| 2010/0123003 A1 | 5/2010 | Olson et al. | |
| 2011/0101109 A1 * | 5/2011 | Bona | G06Q 20/4016 235/492 |
| 2011/0196753 A1 * | 8/2011 | Hodgdon | G06Q 20/105 705/16 |

OTHER PUBLICATIONS

Dynamic Card Solutions Partners with Mountain America Credit Union to Offer Instant Issuance Throughout Utah Anonymous Business Wire p. May 1, 22, 2006 (Year: 2006).*
Zebra Technologies Introduces Fastest Ever ZXP Series 8[TM] Secure Issuance Printer for Secure On-Demand Financial Instant Issuance Card Printing (Year: 2010).*
Dynamic Card Solutions' CardWizard Software Enters Retail Space (Year: 2007).*
ANB Financial Chooses Dynamic Card Solutions' Instant Issuance Technology (Year: 2007).*
DCS rules instant debit-card market (Year: 2006).*
Trustcompany Bank Introduces the Instant Issue-Photo/Signature Debit Card And Sincerely Free Checking (Year: 2003).*
Credit Union Interest Begins To Grow In Datacard's Instant-Issuance System (Year: 2003).*
US News: Long waits for cards now a thing of the past (Year: 2005).*
Dynamic Card Solutions Partners with Mountain American Credit Union to Offer Instant Issuance Throughout Utah Anonymous Business Wire, p. 1, May 22, 2006.

* cited by examiner

SYSTEM AND METHOD FOR INSTANT ISSUE OF PERSONALIZED FINANCIAL TRANSACTION CARDS

CROSS REFERENCE TO RELATED APPLICATIONS

This application is a divisional of U.S. application Ser. No. 16/951,524, filed Nov. 18, 2020, and entitled "SYSTEM AND METHOD FOR INSTANT ISSUE OF PERSONALIZED FINANCIAL TRANSACTION CARDS," which is a continuation of U.S. application Ser. No. 16/373,321, filed Apr. 2, 2019, issued as U.S. Pat. No. 10,846,666 on Nov. 24, 2011, and entitled "SYSTEM AND METHOD FOR INSTANT ISSUE OF PERSONALIZED FINANCIAL TRANSACTION CARDS", which is a continuation of U.S. application Ser. No. 15/014,757, filed on Feb. 3, 2016, issued as U.S. Pat. No. 10,275,747 on Apr. 30, 2019, and entitled "SYSTEM AND METHOD FOR INSTANT ISSUE OF PERSONALIZED FINANCIAL TRANSACTION CARDS", which is a continuation of U.S. application Ser. No. 13/867,678, filed on Apr. 22, 2013, and entitled "SYSTEM AND METHOD FOR INSTANT ISSUE OF PERSONALIZED FINANCIAL TRANSACTION CARDS", which is a continuation of U.S. application Ser. No. 13/186,302, filed Jul. 19, 2011, issued as U.S. Pat. No. 8,429,075 on Apr. 23, 2013, and entitled "SYSTEM AND METHOD FOR INSTANT ISSUE OF PERSONALIZED FINANCIAL TRANSACTION CARDS", which claims priority to U.S. Provisional App. No. 61/365,673, filed Jul. 19, 2010, and entitled "SYSTEM AND METHOD FOR INSTANT ISSUE OF PERSONALIZED FINANCIAL TRANSACTION CARDS", the entirety of each of the foregoing being incorporated by reference herein.

BACKGROUND OF THE INVENTION

The present invention relates to methods and systems for creating, issuing and printing financial transaction cards, such as credit cards issued to consumers by financial institutions.

More specifically, the present invention pertains to methods and systems that allow a bank or other financial institution to instantly and securely issue a personalized credit card to a consumer at a branch or other remote location.

Many new customer accounts opened by banks include one or more debit or credit cards associated with the account. New customer accounts are typically opened at branch locations whereas new cards are often issued by a centralized card services provider that is not physically near the bank branch. Accordingly, the customer must supply card information to a bank employee at the branch. The customer may or may not have an opportunity to select a personalized PIN at that time. This card data is then communicated, perhaps in a batch mode with other card data, to a card services provider.

The card services provider fulfills the card request by printing and encoding the card, then mailing it to the branch or to the customer. The customer must then activate the card. This process involves delay and expense that is undesirable and may introduce unnecessary security risks.

What is needed, then, is a low cost, secure, simple and easy to install system and method for providing instant issue of personalized financial transaction cards in a bank branch. This needed system and method should interface with the new accounts platform/host used by the bank and meet all of the security requirements imposed by the major credit and debit card issuers and transaction processors.

BRIEF SUMMARY OF THE INVENTION

In one embodiment, the present invention is a method for issuing a personalized financial transaction card from a financial institution to a customer in response to a customer request made from a branch location associated with the financial institution. A bank employee or operator receives customer information and card information from the customer at the branch location. The card information may include a card personal identification number (PIN). The operator inputs the customer information and at least some the card information into a data processing terminal at the branch.

The customer information and the card information are communicated from the branch across a network to a card services provider. At the card services provider, the PIN is entered into a PIN database, a reference number associated with the customer is generated, and a PIN offset is generated. The reference number and at least some of the customer data and card data may be stored in a card file associated with the customer. The reference number is used to retrieve the PIN from the PIN database. The retrieved PIN is then used to apply calculations to the card file.

The card file is securely sent from the card services provider across the network to the branch location. Using information from the card file, the financial transaction card is printed for the customer at the branch location. In a preferred embodiment, the personalized card is instantly issued while the customer is present at the branch location.

In another embodiment, a verification message may be sent to the financial institution and to a card transaction processor when the financial transaction card has been successfully printed. Also, an error message may be sent to the branch location and to a card transaction processor when the financial transaction card does not successfully print.

In a further embodiment of the method, the step of securely sending the card file to the branch location may include distributing a virtual desktop from a server at the card services provider across the network to a virtual desktop client at the branch location.

In some embodiments, the card file may be stored at the branch location and the step of storing the reference number and at least some of the customer data further may include updating the card file with the reference number at the branch location.

In yet another embodiment of the invention, after the card file at the branch location is updated with the reference number, the method may include sending a card issue request from the branch location and receiving it in a hardware security module (HSM) at the card services provider. In this embodiment, in response to receiving the card issue request, the HSM may retrieve the PIN from the PIN database and apply the reference number to the calculations in the card file.

Thus, the system and method of the present invention will minimize upfront costs incurred by financial institution banks for hardware, software, licensing and maintenance fees. It will provide a secure process for customer selected PINs and rely upon secure web service applications to transmit card personalization data to drive the remote card printers.

BRIEF DESCRIPTION OF THE SEVERAL VIEWS OF THE DRAWINGS

FIG. 3l is a block diagram of the system of FIG. 3a, further showing the application server retrieving the card image calculation information from the database and returning the results.

DETAILED DESCRIPTION OF THE INVENTION

Referring now to FIGS. 1(a)-(k), an arrangement of hardware and software elements, components, and modules used in one embodiment of the system 10 of the present invention is shown. In this embodiment, a bank provides retail banking services to customers through one or more bank branches 15a-15c. The branches 15 run data processing systems connected to each other and to a bank central office by a wide area network (WLAN) or system web service 20 and a public data network 5, such as the public Internet.

Conventionally, the bank and its branches 15 are authorized to issue financial transaction cards, such as debit or credit cards, which are associated with a branded card transaction processor such as Visa® or MasterCard®. These transaction processors operate and control a global financial network of electronically interconnected card issuers, acquirers, merchants, and data processing centers.

Figure 1A:
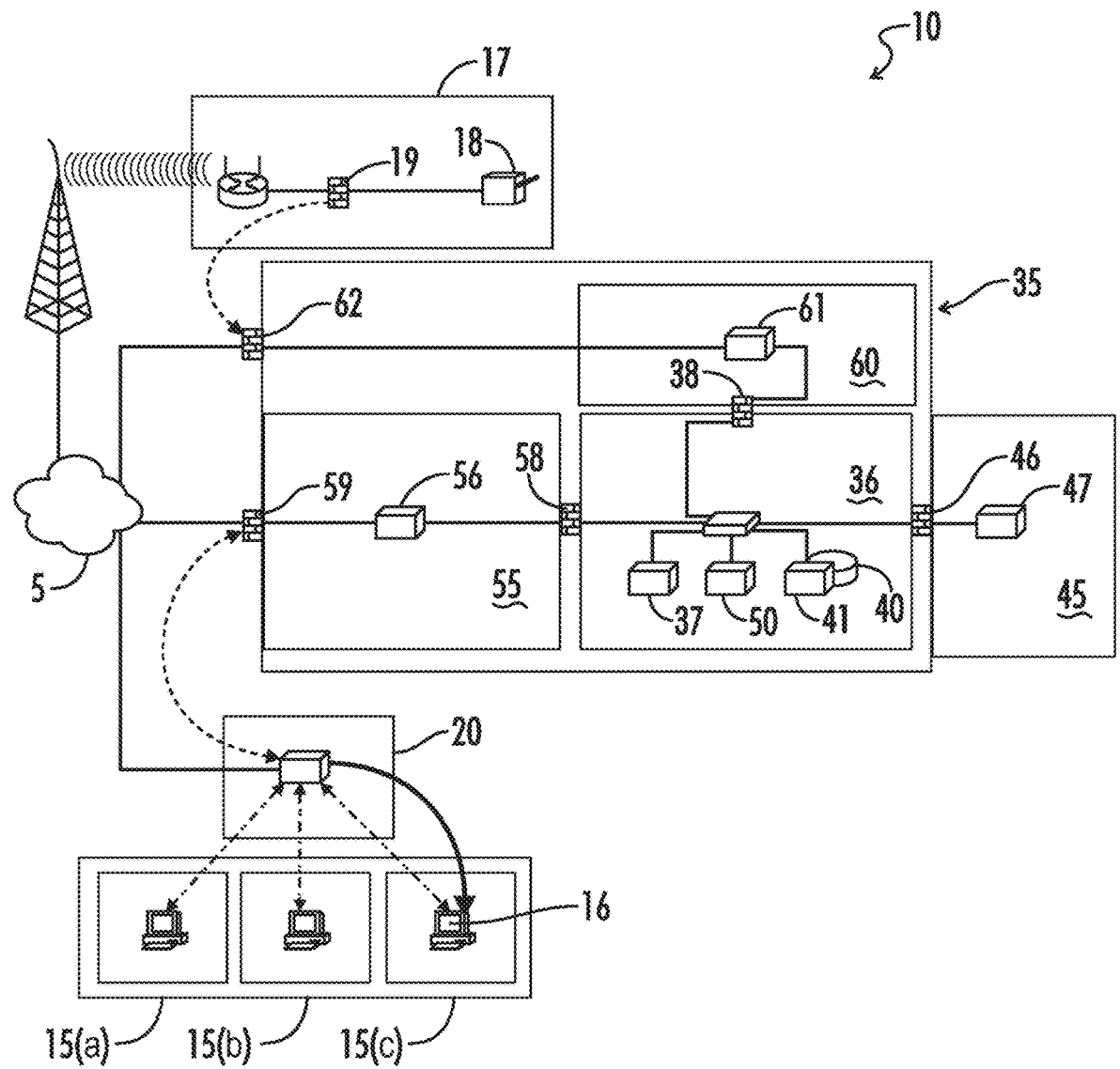
FIG. 1(a) is a block diagram showing an arrangement of hardware and software modules in accordance with one embodiment of the system of the present invention, further showing system communications from a bank branch desktop PC that communicates an instant card issue request to the system web service.

The bank may contract with a card services provider to provide services associated with the issuance of a new credit or debit card to a bank customer. In the embodiment of FIG. 1(a), the card services provider will operate hardware and software networks 35 that can receive and process requests for new cards sent by a bank branch 15. The card service provider networks may include an instant issue web service DMZ network 55, an instant issue server network 36, an instant issue personalization network 45, and an instant issue print DMZ network 60.

The instant issue server network 36 may include an active directory or domain controller 37, an application server 50, and a database server 41. Accordingly, the card services provider will maintain a PIN (Personal Identification Number) database 40 connected to the database server 41 that can securely store PINs selected by bank customers when a new card is issued.

As part of the instant issue personalization network 45, the card services provider may also operate a hardware-host security module (HSM) 47 to provide a secure environment for card data encryption, PIN calculations, sensitive cryptographic operations, secure key storage, and management of a large number of secure keys, as is known to a person of skill in the art. A hardware-host security module, as known to those of skill in the art, is a combination of hardware and software/firmware that is functionally connected to a PC or server to provide cryptographic functions. The HSM 47 may include a user interface and programmable interface. The physical part of an HSM, which may be a plug-in card or external device such as a physical Windows Server, may include tamper-resistant features.

Preferably, the functional interface between the card services provider networks 35, the public network 5, and the system web service 20 may include a web service "demilitarized zone" (DMZ) network 55. A demilitarized zone, sometimes referred to as a Perimeter Network, is a physical or logical sub-network that contains and exposes an organization's external services to a larger untrusted network, such as the Internet. The DMZ network 55 adds an additional layer of security to the communications link between the system web service 20 and the card services provider networks 35, so that an external attacker has access only to hardware in the DMZ and not in any other part of the networks. Within the DMZ network 55 is a card services provider web service 56. The web service 56 may be implemented using, for example, a Windows virtual server or Apache proxy server.

The DMZ network 55 and the system web service 20 may be interconnected by a private network connection or across the public network 5, such as the public Internet. In one embodiment, this connection may be implemented by an encrypted (e.g., IPSEC) Virtual Private Network (VPN) tunnel using an IPSEC endpoint device or security appliance 59. One conventional example of a security appliance that may be used is a Model ASA 5050 Firewall from Cisco Systems, Inc. The instant issue server network 36 may be coupled to the DMZ network 55 through a firewall 58, e.g., a virtual appliance. The HSM 47 is also functionally coupled to the instant issue server network 36 using a firewall 46, e.g., a virtual appliance.

The card services provider networks 35 may include an instant issue card print network DMZ 60 containing a print server 61. The instant issue card print network DMZ 60 may be connected to the DMZ network 55 through a firewall 38, e.g., a security appliance such as the Cisco ASA 5050 Firewall. The instant issue card print network DMZ 60 and the system web service 20 may be interconnected by a private network connection or across the public network 5. In one embodiment, this connection may be implemented by an encrypted (e.g., IPSEC) Virtual Private Network (VPN) tunnel using and an IPSEC endpoint device 62 such as the Cisco ASA 5050 Firewall.

The system 10 may also include hardware and software located at each branch location 15, including one or more desktop PCs or workstations 16 functionally coupled to the system web service 20 and a branch card printer network 17. In one embodiment, the branch card printer network 17 includes a card printer 18. The branch card printer network 17 may be isolated and therefore coupled to the instant issue card print network DMZ 60 using a VPN tunnel established between a firewall and IPSEC endpoint device and endpoint device 62. The branch card printer network 17 may also be connected to the public network 5 through firewall and IPSEC endpoint device 19. In the embodiment shown, a wireless internet connection is used. In one embodiment, the card printer 18 may be a Datacard Model FP65i Financial Card Printer from the Datacard Group.

In the embodiment of FIGS. 1(a)-(k), the branch desktop PCs 16 can securely communicate with the card services provider networks 35. The branch PCs 16 will access and display one or more browser-based system user interfaces generated by the system web service 20 and card services provider web service 56. This user interface on the branch PCs 16 is used by a bank operator at the branch during the process of using the system 10 to request and issue a new card. The desktop PCs 16 are functionally coupled to the client services provider networks 35 through the system web service 20 and DMZ network 55 to provide secure data communications between the branches 15 and the card services provider networks.

The branch card printer 18 is functionally coupled to the client services provider print server 61 to securely receive card print commands. The card printer 18 may be equipped with a supply of blank card stock. The card printer 18 uses the data in a card file to imprint a blank card with personalized information associated with and selected by a customer.

Figure 2:
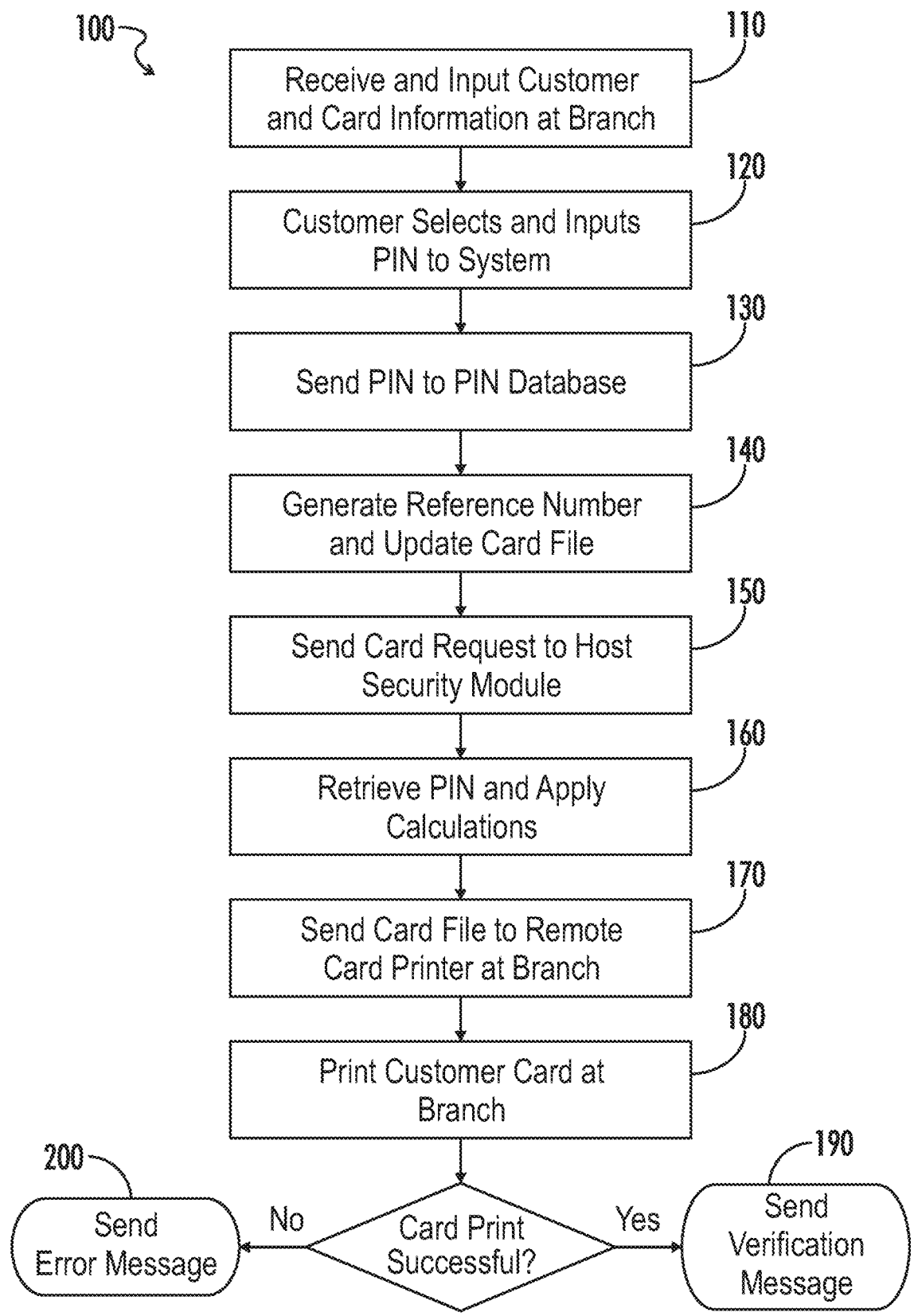
FIG. 2 is a flow chart illustrating a method for instant issue of a personalized credit card at a bank branch, in accordance with one embodiment of the present invention.

Referring now to FIG. 2, an embodiment of a method 100 for instant issue of a personalized credit card to a bank customer located at a bank branch location can be described. In a first step 110, a bank employee or other system operator working in the branch receives information from the customer that is needed to initiate the request for issuance of a personalized credit or debit card to the customer. This information is entered into corresponding card data fields used by the system. In one embodiment the card data fields are part of a CAF card file. The data fields in the card file may include data identifying the customer by name and address, the branch, the bank operator, and the particular type of financial transaction card (e.g., credit or debit) being requested.

In a second step 120, the customer selects a PIN (Personal Identification Number) that will be associated with the card to be issued to the customer. In a preferred embodiment, the personalized PIN is entered into the system by the customer directly, using a keypad-type data terminal at the branch or a telephone and voice recognition system, so that the bank operator does not see or hear the PIN. A PIN selection system that can be used for this purpose is described in U.S. Pat. No. 5,132,521, the entire disclosure of which is incorporated herein by reference.

The selected PIN is communicated electronically 130 to a PIN database. In one embodiment, the PIN database is maintained remotely by a card services company that contracts with the bank to produce, encode, and issue personalized financial transaction cards to customers of that bank.

In a fourth step 140, the software associated with the PIN database generates a reference number associated with the customer and the selected PIN. The reference number is communicated to and may be stored in the card file associated with the customer as a file update. This updated card file may be used by the system software used at the branch location.

In one embodiment of the method, after the card file is updated following generation of the reference number, a card request is communicated 150 to an edit function software application in the hardware host security module (HSM) 47. The HSM 47 may be controlled by a card services provider remote from the branch. The HSM edit function application uses the reference number to retrieve 160 the PIN from the PIN database so that algorithmic calculations can be applied to the PIN in the card file.

In a next step 170, the card file is securely sent to a remote card printer at the branch location. In one embodiment, this step is implemented by a means of a virtual desktop server communicating with a virtual desktop client associated with the remote card printer and a PC or terminal located at the branch.

The customer's card is then printed 180 by the remote printer using the data in the card file. After the card is printed, a verification message may be sent 190 to the bank and to the card transaction processor. This verification message confirms that the card is ready for use by the customer. Alternatively, if the card printing is not successful, an error message is communicated 200 to the bank operator in the branch and to the transaction processor.

An embodiment of a method for instant issue of a personalized credit card to a bank customer located at a bank branch location can be further understood by reference to FIGS. 1(a)-1(k). To initiate the process as shown in FIG. 1(a), a system operator makes a card issue request at the branch desktop PC 16, which then communicates an instant card issue request to the system web service 20.

Figure 1B:
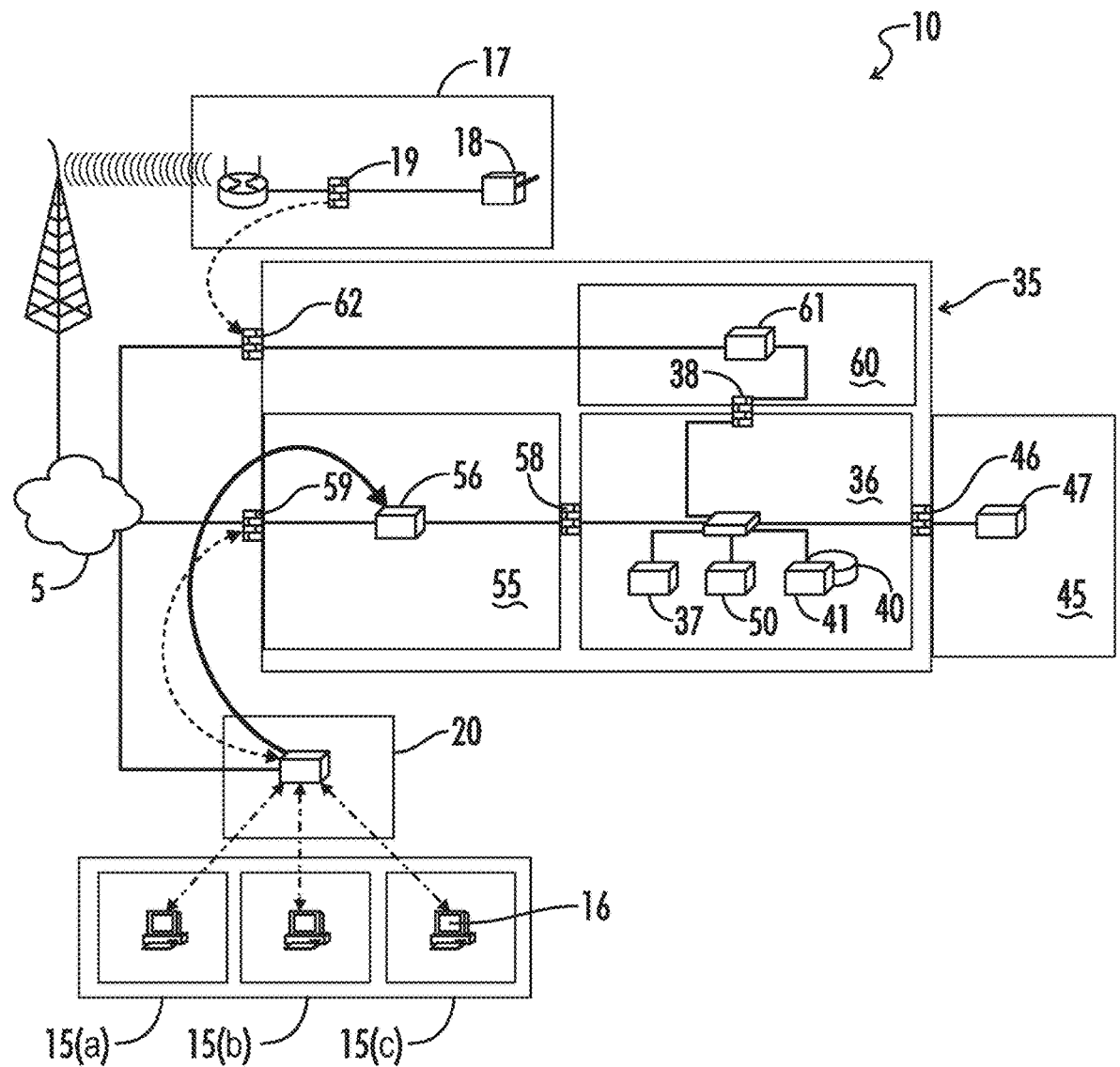
FIG. 1(b) is a block diagram of the system of FIG. 1(a), further showing system communications between the system web service and the card services provider web service after initiation of the instant issue request as shown in FIG. 1(a).
Figure 1C:
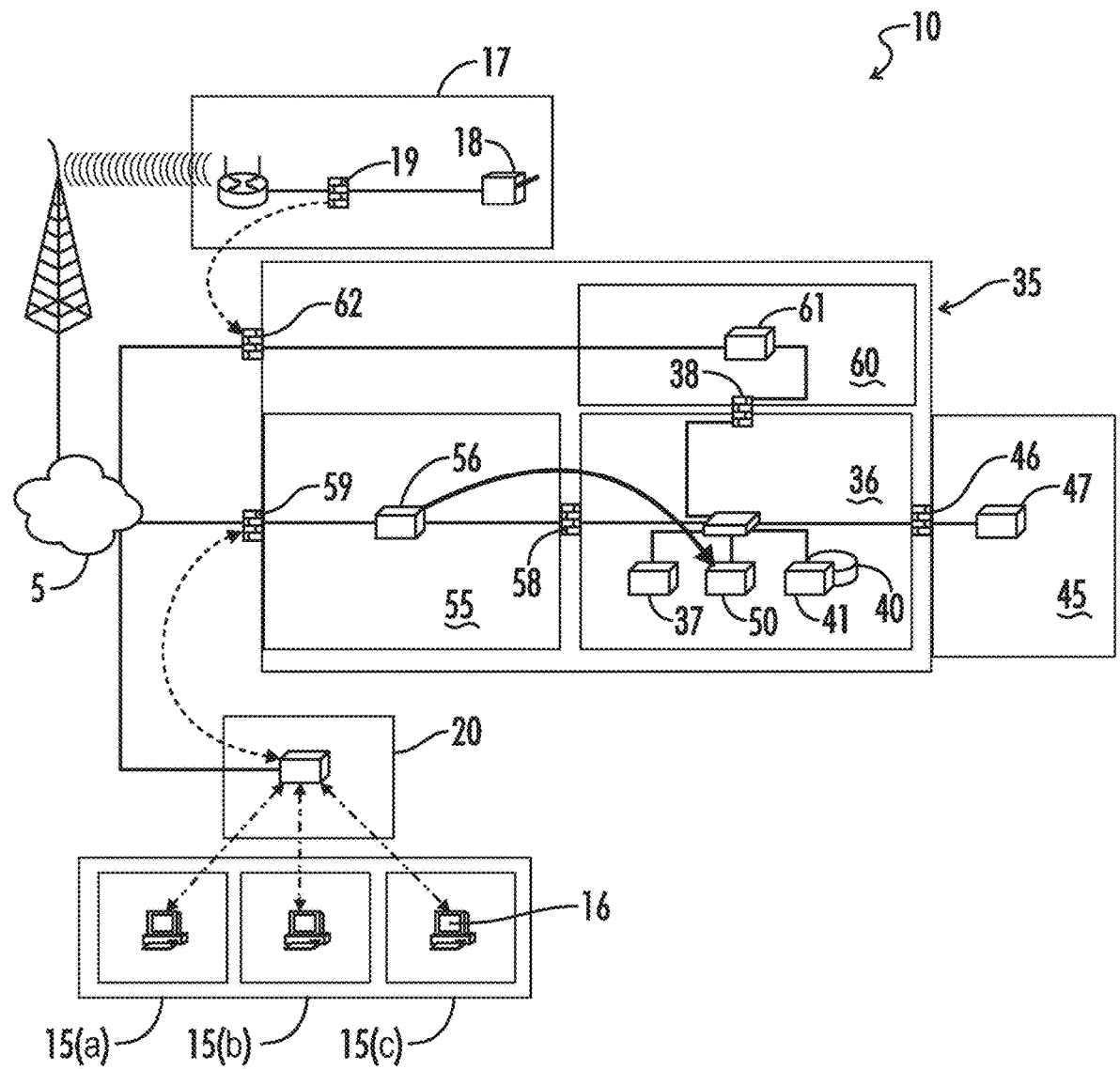
FIG. 1(c) is a block diagram of the system of FIG. 1(a), further showing system communications between the card services provider web service and the card services provider application server after initiation of the instant issue request as shown in FIGS. 1(a) and 1(b).
Figure 1D:
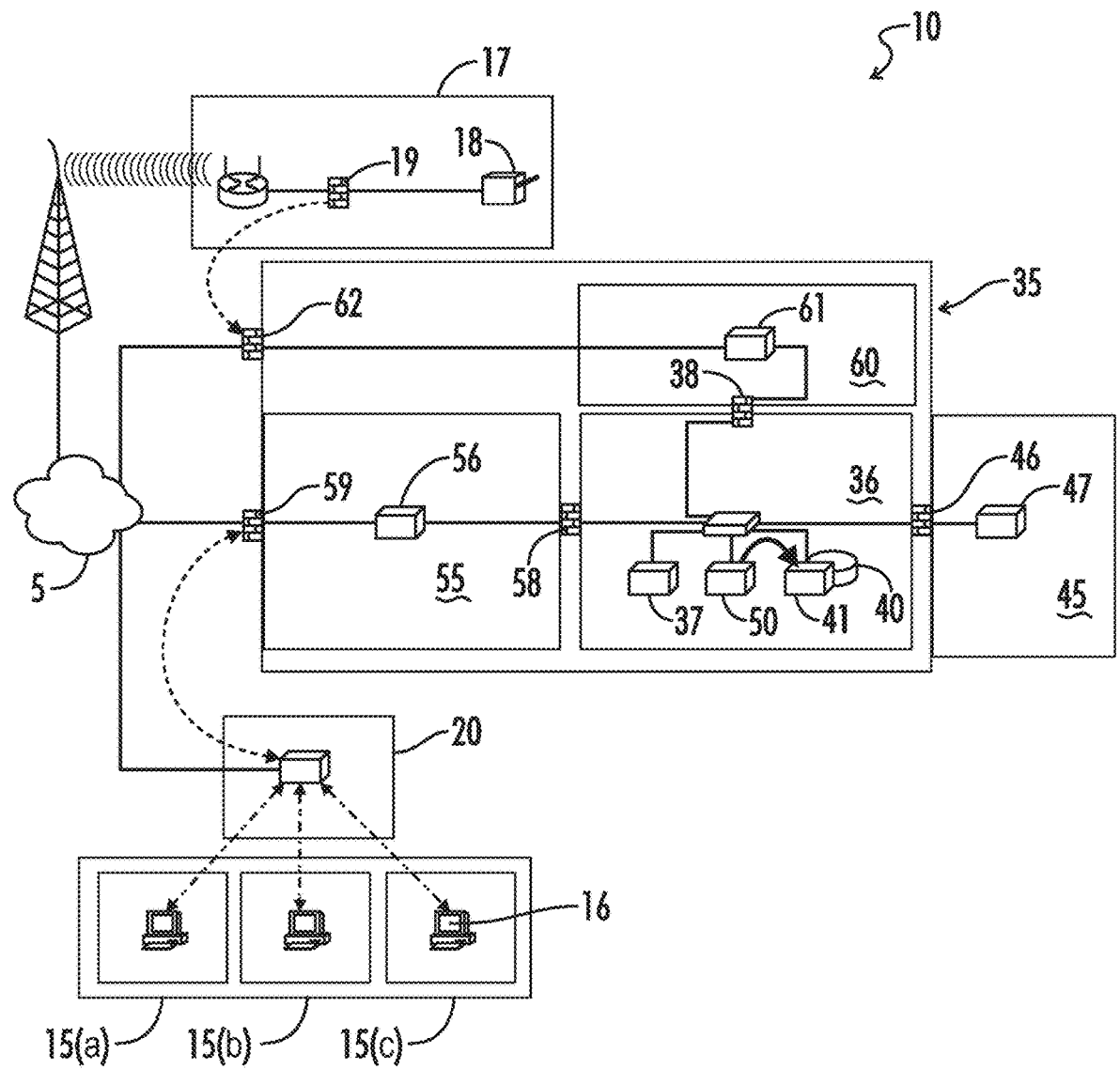
FIG. 1(d) is a block diagram of the system of FIG. 1(a), further showing the card services provider application server placing data into a card services provider database server after initiation of the instant issue request as shown in FIGS. 1(a)-1(c).
Figure 1E:
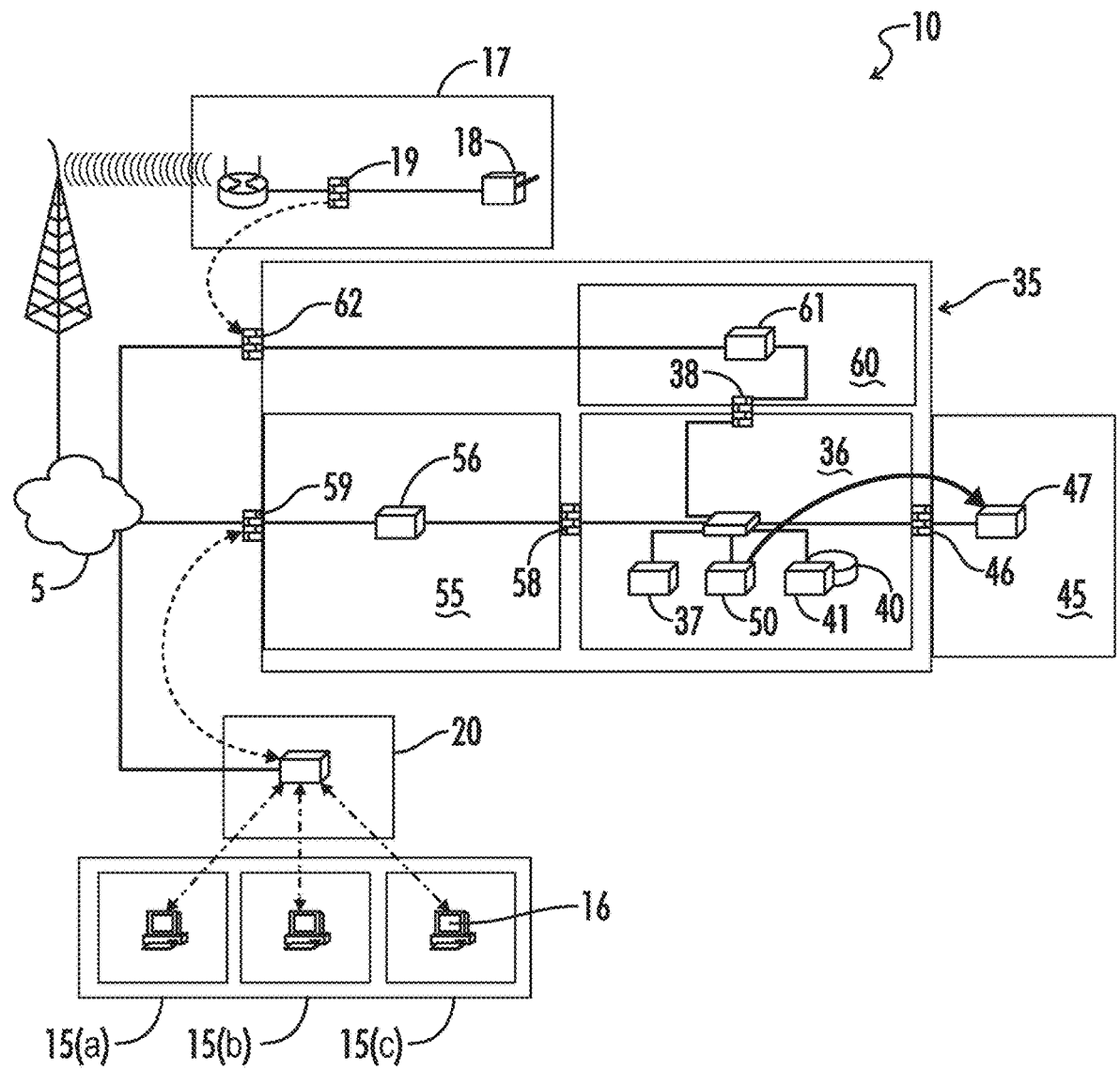
FIG. 1(e) is a block diagram of the system of FIG. 1(a), further showing the card services provider application server retrieving a PIN/offset calculation from the card services provider hardware security module after initiation of the instant issue request as shown in FIGS. 1(a)-1(d).

The system web service 20 connects to the card services provider web service 56 over a persistent secure (e.g., IPSEC) tunnel and communicates the card instant issue request to the client services provider networks 35, as shown in FIG. 1(b). The card services provider web service 56 connects to the card services provider application server 50 (FIG. 1(c)). In response, the application server 50 places data into the card services provider database 40 (FIG. 1(d)). As shown in FIG. 1(e), the card services provider application server 50 then retrieves a PIN/offset calculation from the card services provider hardware security module 47.

Figure 1F:
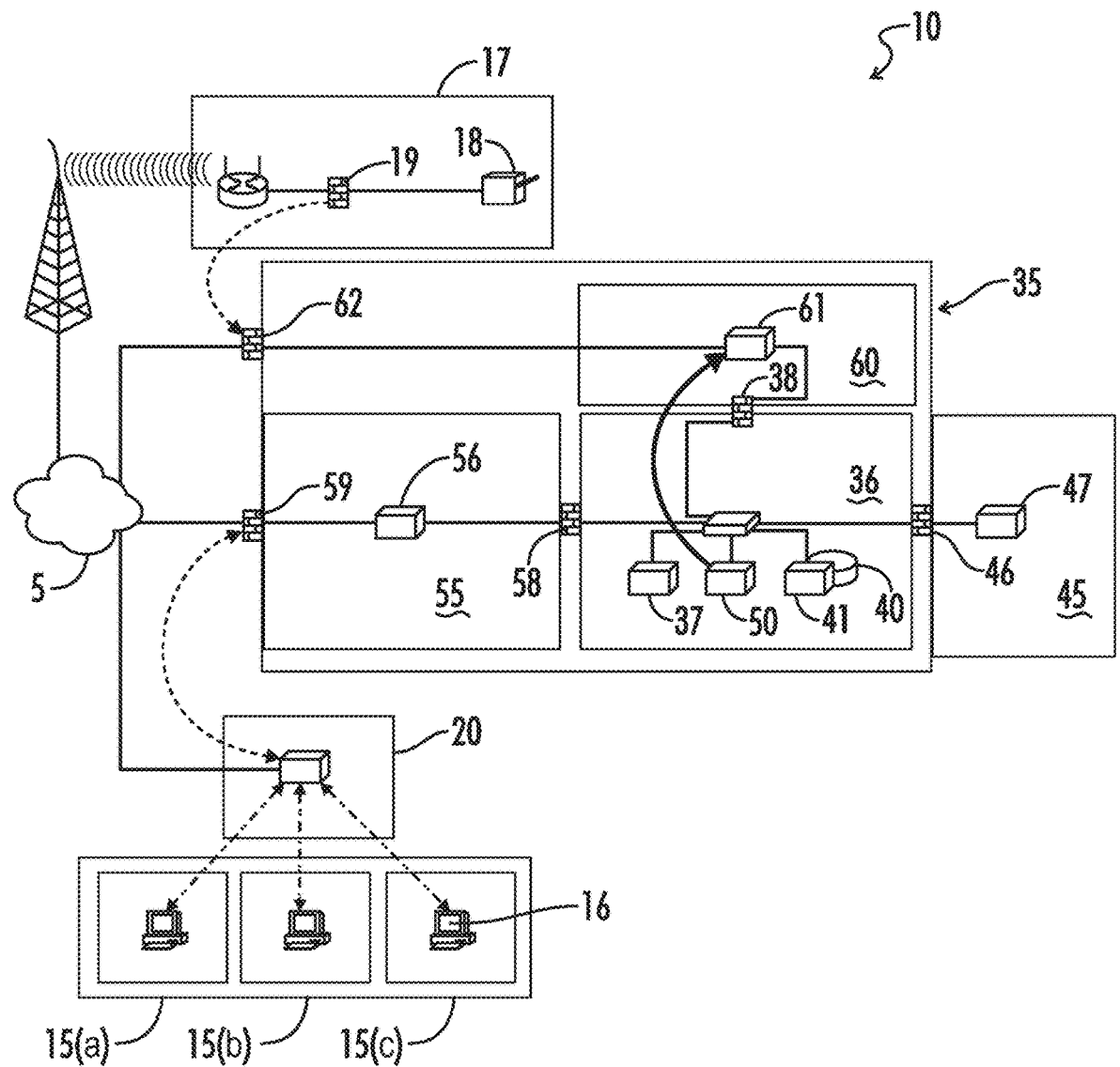
FIG. 1(f) is a block diagram of the system of FIG. 1(a), further showing the card services provider application server communicating a card print job to the card services provider print server after initiation of the instant issue request as shown in FIGS. 1(a)-1(e).
Figure 1G:
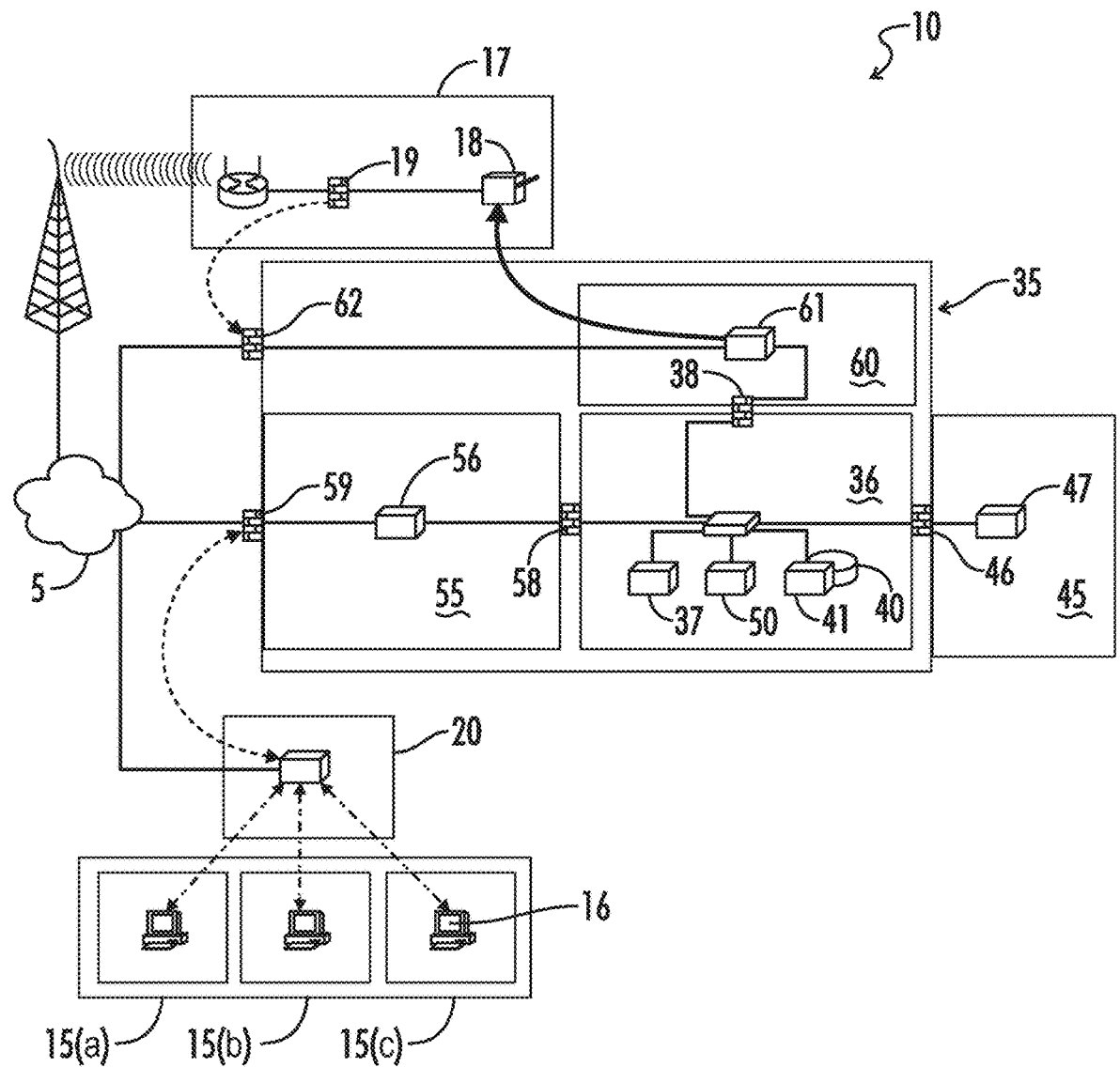
FIG. 1(g) is a block diagram of the system of FIG. 1(a), further showing the card services provider print server securely communicating a card print job to a printer at the bank branch, after initiation of the instant issue request as shown in FIGS. 1(a)-1(f).

The card services provider application server 50 communicates a card print job to the card services provider print server 61, as seen in FIG. 1(f). This card print job is sent to the instant issue card printer 18 (FIG. 1(g)). This allows the financial transaction card to be printed at the bank branch 15 that made the card issue request.

Figure 1H:
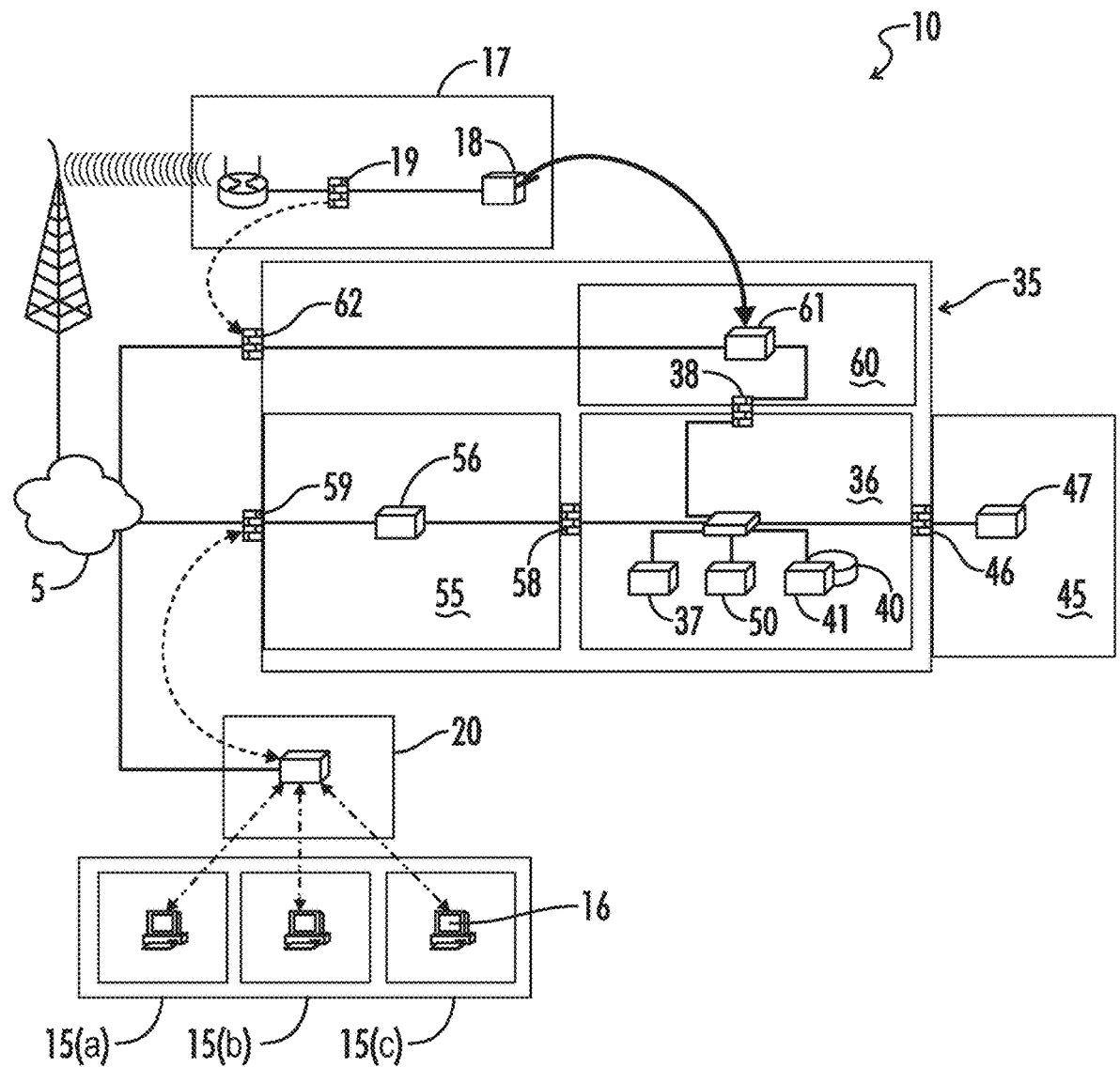
FIG. 1(h) is a block diagram of the system of FIG. 1(a), further showing the printer at the bank branch communicating a card print job success or failure message back to the card services provider print server, after initiation of the instant issue request as shown in FIGS. 1(a)-1(g).
Figure 1I:
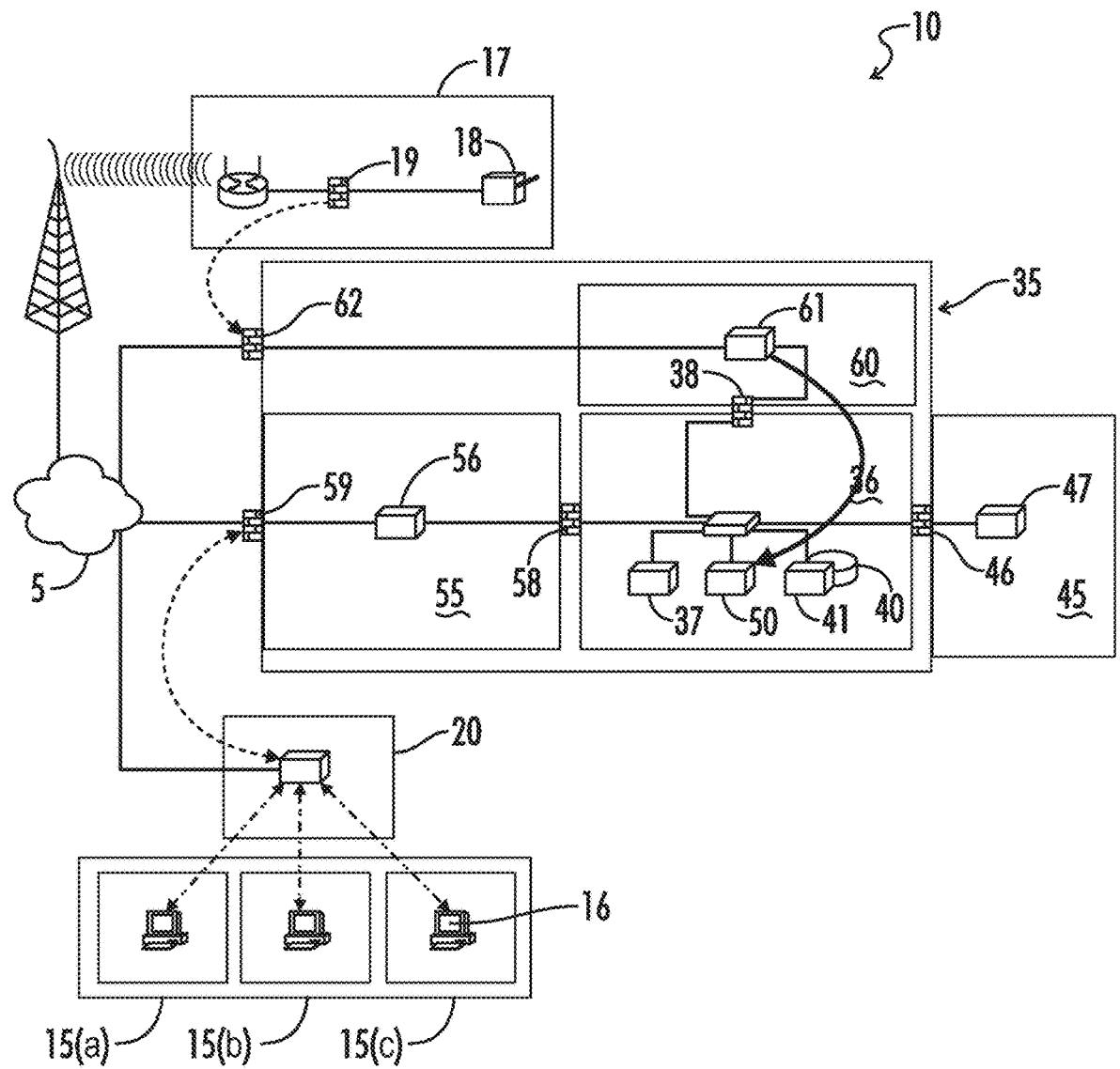
FIG. 1(i) is a block diagram of the system of FIG. 1(a), further showing the card services provider print server communicating a card print job success or failure message back to the card services provider application server, after initiation of the instant issue request as shown in FIGS. 1(a)-1(h).
Figure 1J:
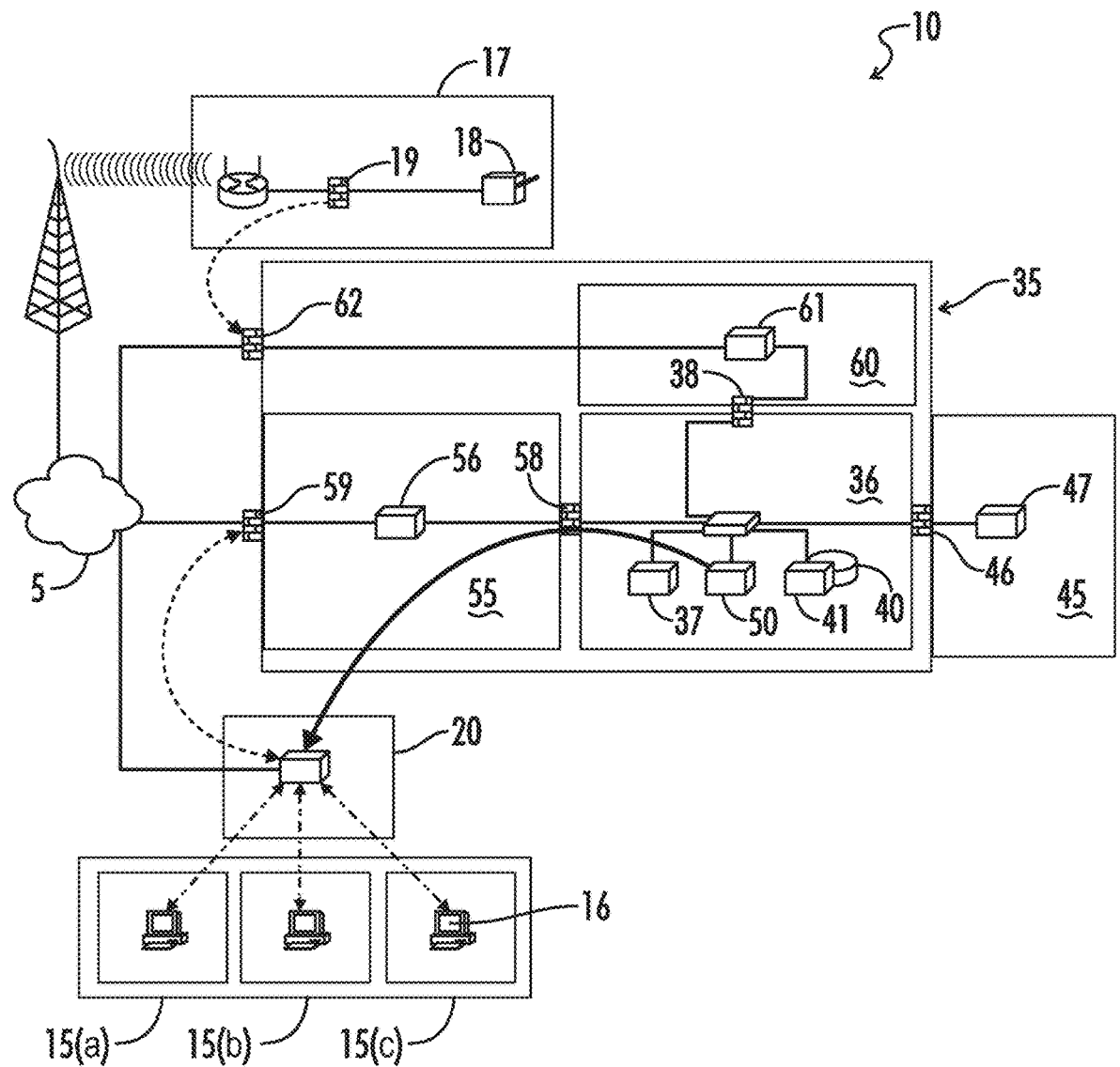
FIG. 1(j) is a block diagram of the system of FIG. 1(a), further showing the card services provider application server posting card print success or failure information to the system web service, after initiation of the instant issue request as shown in FIGS. 1(a)-1(i).
Figure 1K:
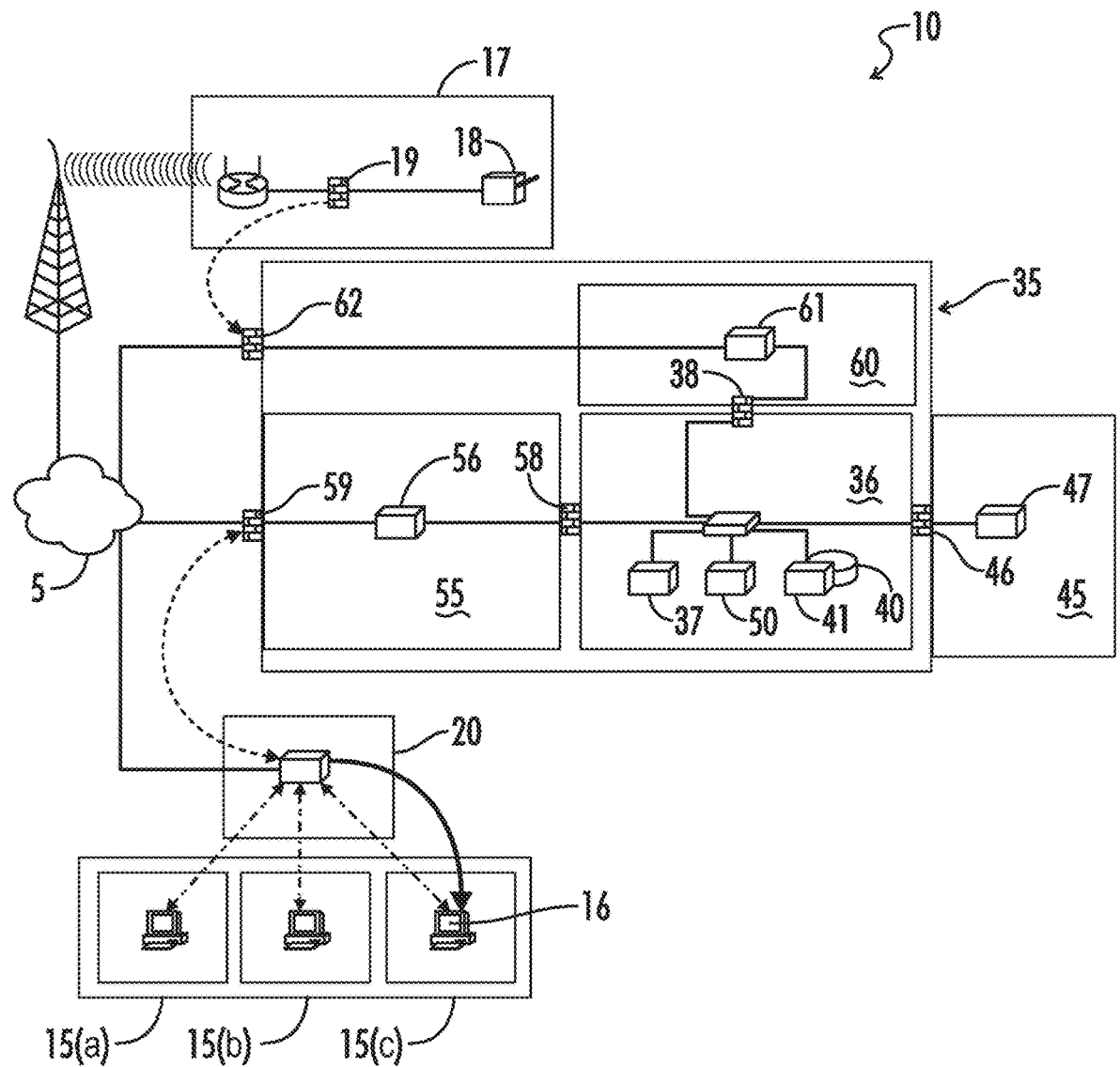
FIG. 1(k) is a block diagram of the system of FIG. 1(a), further showing the system web service communicating card print success or failure information to the bank branch desktop PC, after initiation of the instant issue request as shown in FIGS. 1(a)-1(j).

The printer 18 communicates a card print job success or failure message back to the card services provider print server 61 (FIG. 1(h)). The card services provider print server 61 then communicates a card print job success or failure message back to the card services provider application server 50 (FIG. 1(i)). The card services provider application server 50 then posts card print success or failure information to the system web service 20 ((FIG. 1(j)). Finally, as shown in FIG. 1(k), the system web service 20 communicates card print success or failure information to the bank branch desktop PC 16.

Figure 3A:
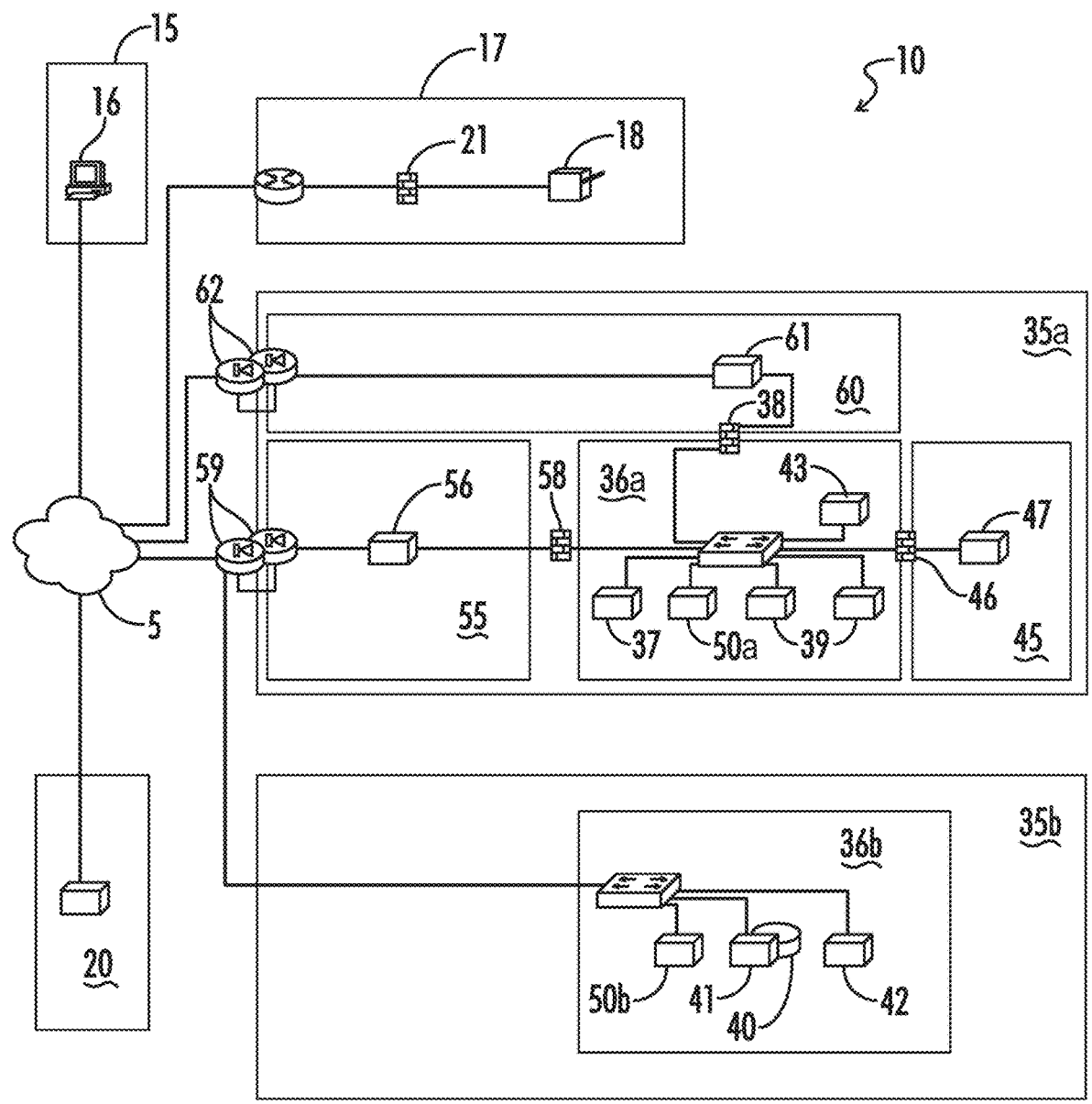
FIG. 3a is a block diagram showing an arrangement of hardware and software modules in accordance with another embodiment of the system of the present invention.

FIG. 3a illustrates another embodiment of the system 10 in which the card printer 18 at the branch location 15 is physically combined with a security appliance 21 inside a common housing. In this embodiment, the combination of the card printer 18 and security appliance 21 may be PCI (Payment Card Industry) compliant. This compliance requires a novel method of managing an IPSEC tunnel through a Linux appliance 21.

There are several known techniques for negotiating an IPSEC tunnel. A common technique is to use a pre-shared key (PSK) shared between two public, static IP addresses. This type of tunnel allows either end to initiate the tunnel when traffic designated for the other end of the tunnel is detected. This traffic is known in the art as "interesting traffic". When there is no "interesting traffic" (for a pre-configured period of time) the security association between the end-points will be terminated and thus the IPSEC tunnel is said to be "down." This is not a problem for two public, static IP Addresses, as either side can initiate the tunnel to the public address on the remote end. However, when one side of the tunnel will not be static, or the IP address will not be known, or if it is behind a router/firewall that does Network Address Translation (NAT), only one end (the non-static, non-public end) may initiate the IPSEC tunnel. For the static, public (non-initiating) end of the tunnel to send traffic to the private, dynamic end, the tunnel must be aggressively kept "up" at all times. To achieve this, the system embodiment shown in FIG. 3 includes a device with an operating system built into the printer case. This built-in Linux appliance 21 on the private, dynamic end (at the bank branch) is able to initiate the IPSEC tunnel while monitoring the other side for connectivity. If monitoring detects problems, the device 21 is able to re-establish the IPSEC tunnel. Thus, the appliance 21 may be a hardened Linux appliance functioning as a router, firewall, and dynamic-to-static IPSEC endpoint that complies with Center for Internet Security (CIS) standards. In this embodiment, the card printer 18 may be a Dualys card printer from Evolis.

In the embodiment of FIG. 3a, the card services provider will operate hardware and software networks 35a and 35b that can receive and process requests for new cards sent by a bank branch 15. The network 35a is PCI-compliant and includes an instant issue web service DMZ network 55, an instant issue server network 36a, an instant issue personalization network 45, and an instant issue print DMZ network 60, as described above with reference to FIG. 1(a).

The PCI compliant instant issue server network 36a may include an active directory or domain controller 37, an application server 50a, one or more workstations 39, and an IPSEC administrative server 43.

Card services provider network 36b includes an application server 50b, a PIN database 40 connected to a database server 41 to securely store PINs selected by bank customers when a new card is issued, and a file server 42.

Figure 3B:
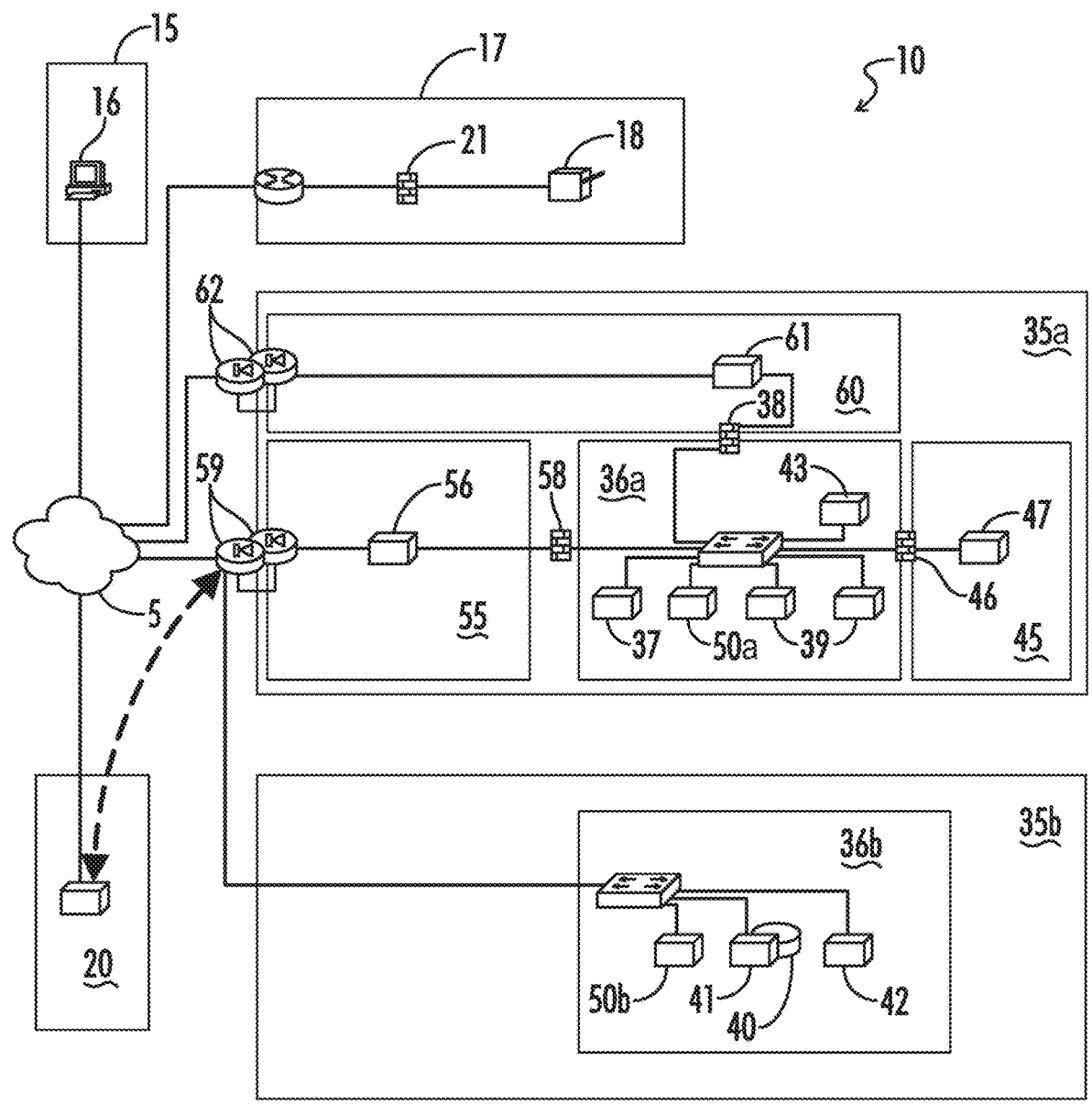
FIG. 3b is a block diagram of the embodiment of the system of FIG. 3a, further showing a site-to-site VPN tunnel being established between the system web service and the card services provider web service.
Figure 3C:
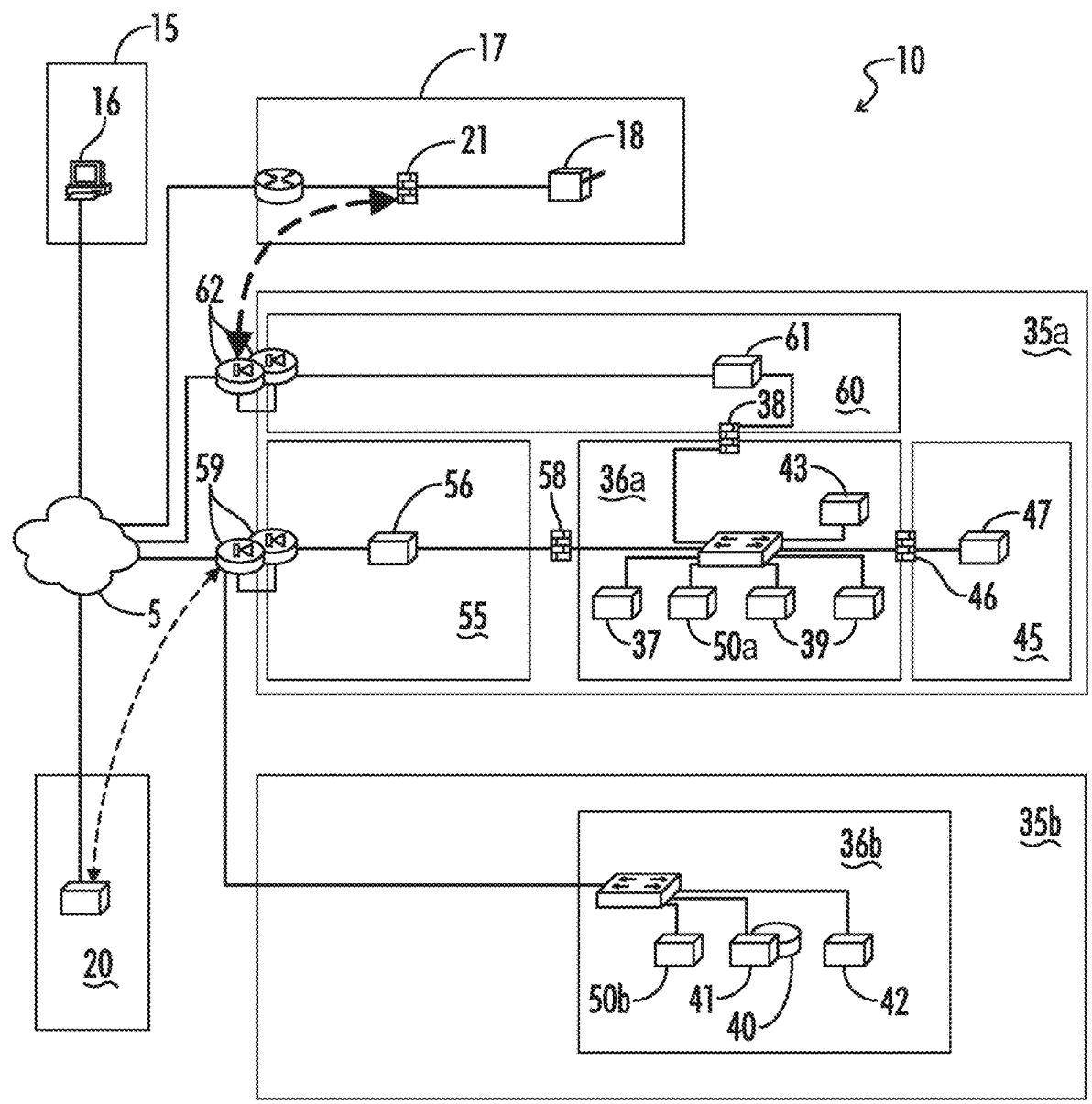
FIG. 3c is a block diagram of the system of FIG. 3a, further showing a dynamic site-to-site VPN tunnel created between the printer and printer appliance and the print DMZ network.
Figure 3D:
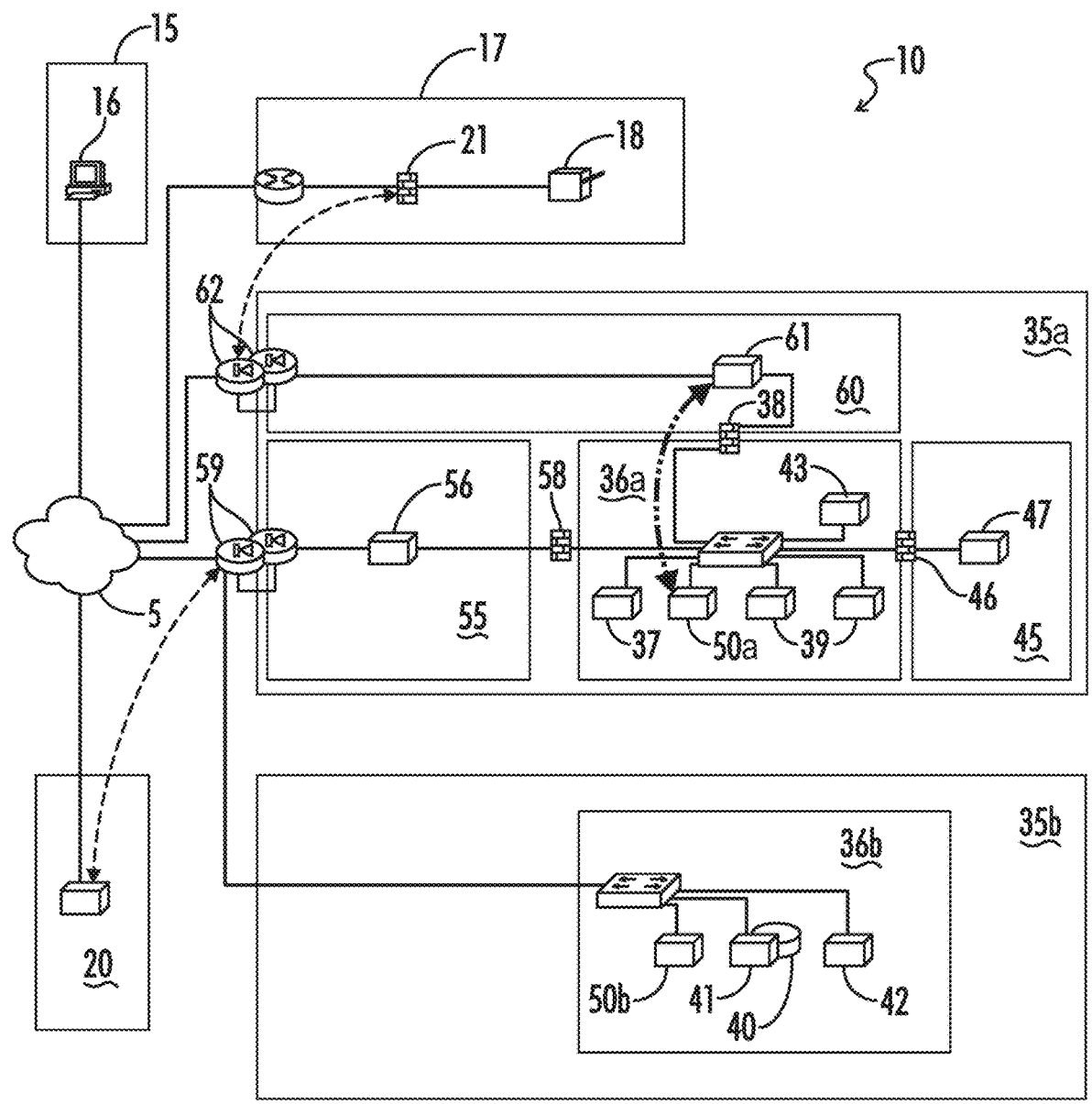
FIG. 3d is a block diagram of the system of FIG. 3a, further showing a persistent connection between the print server to the application server.
Figure 3E:
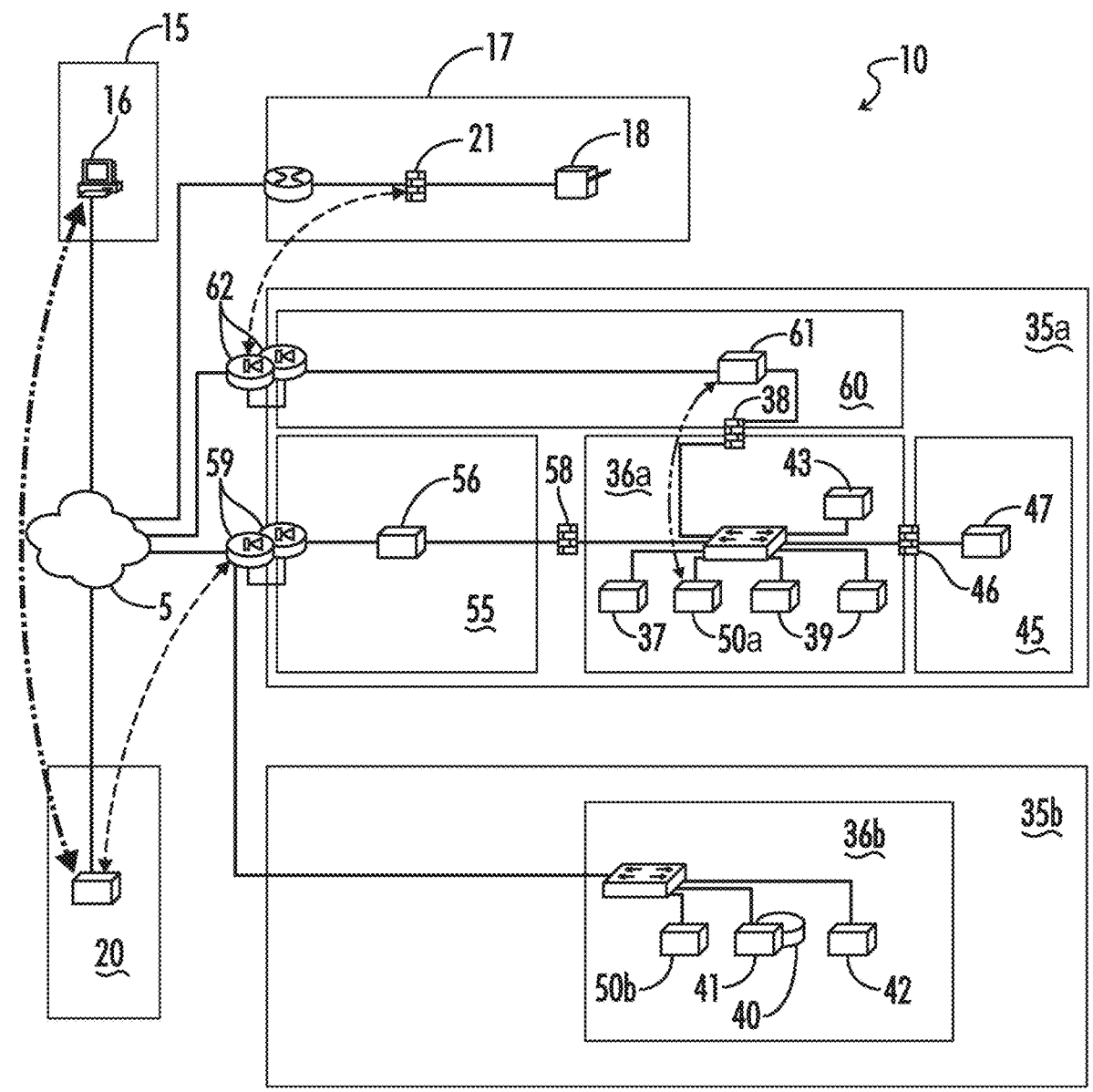
FIG. 3e is a block diagram of the system of FIG. 3a, further showing the bank branch issuing a card instant issue request to the system web service.
Figure 3F:
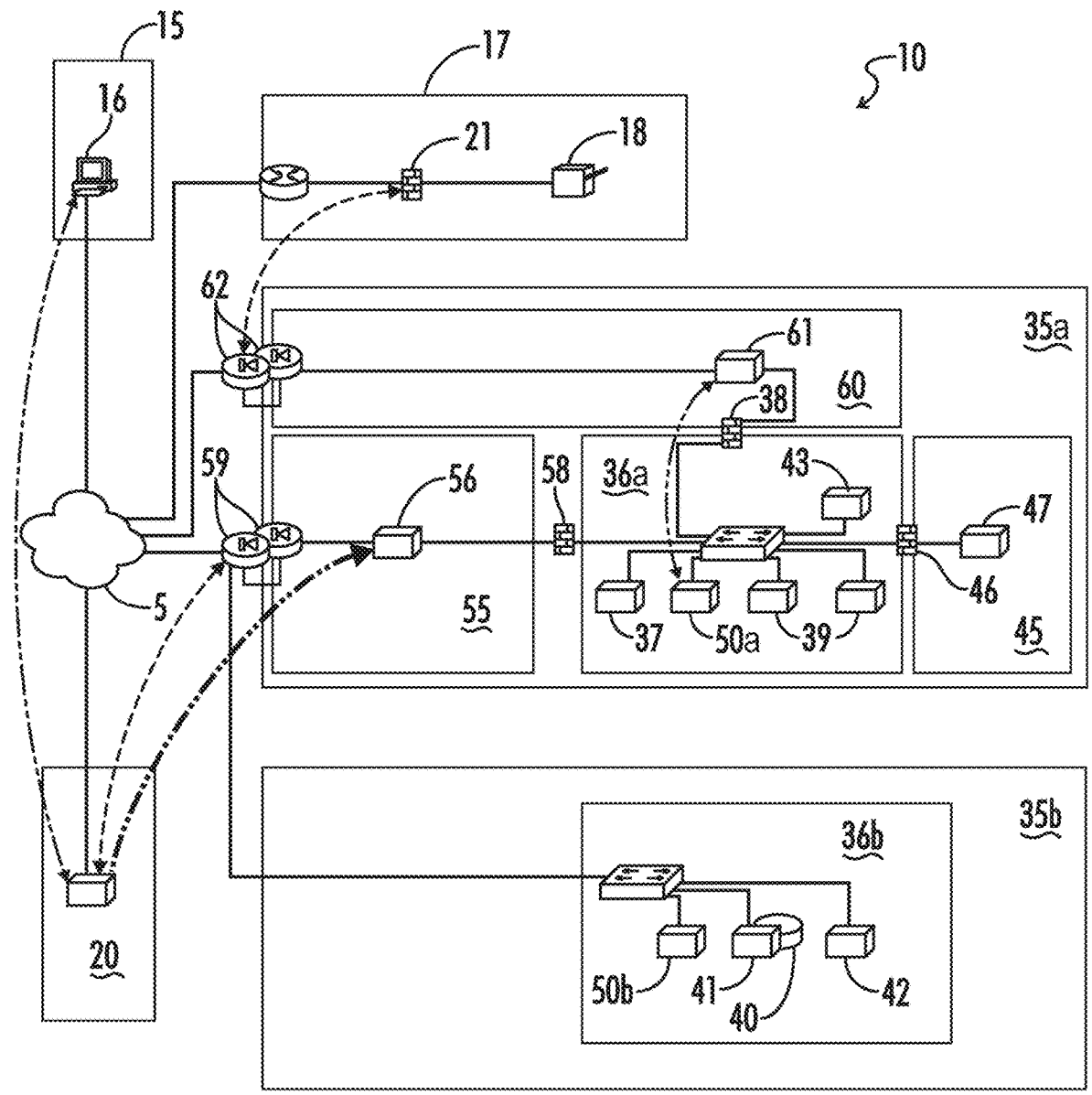
FIG. 3f is a block diagram of the system of FIG. 3a, further showing the system web service sending an HTTP POST request to the web service DMZ network.
Figure 3G:
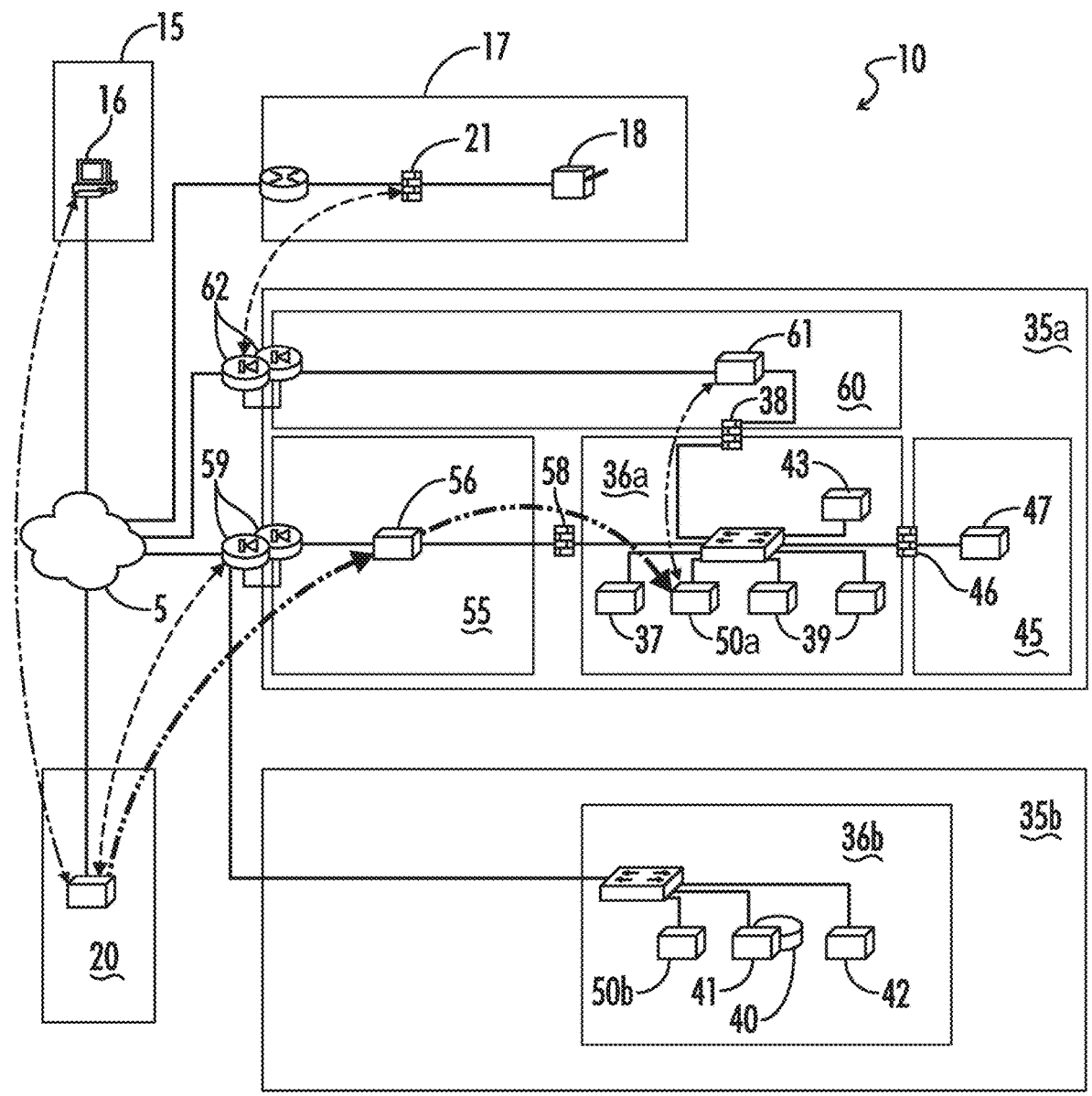
FIG. 3g is a block diagram of the system of FIG. 3a, further showing the HTTP POST being proxied to the PCI-compliant card services provider application server and the HTTP status being returned to the web service.
Figure 3H:
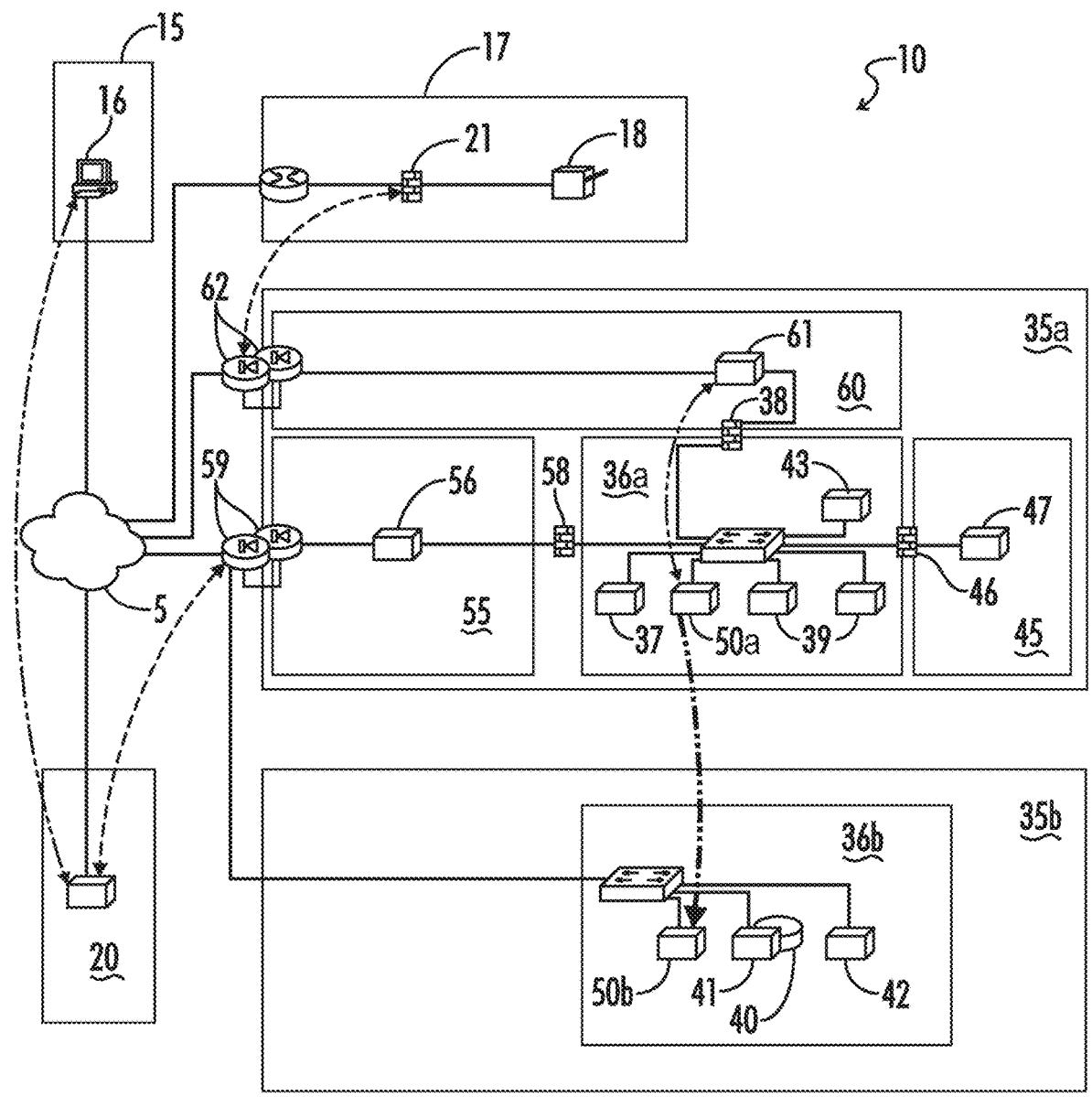
FIG. 3h is a block diagram of the system of FIG. 3a, further showing the PCI-compliant application server 50a requesting a card CVV Key Cryptogram from application server 50b.
Figure 3I:
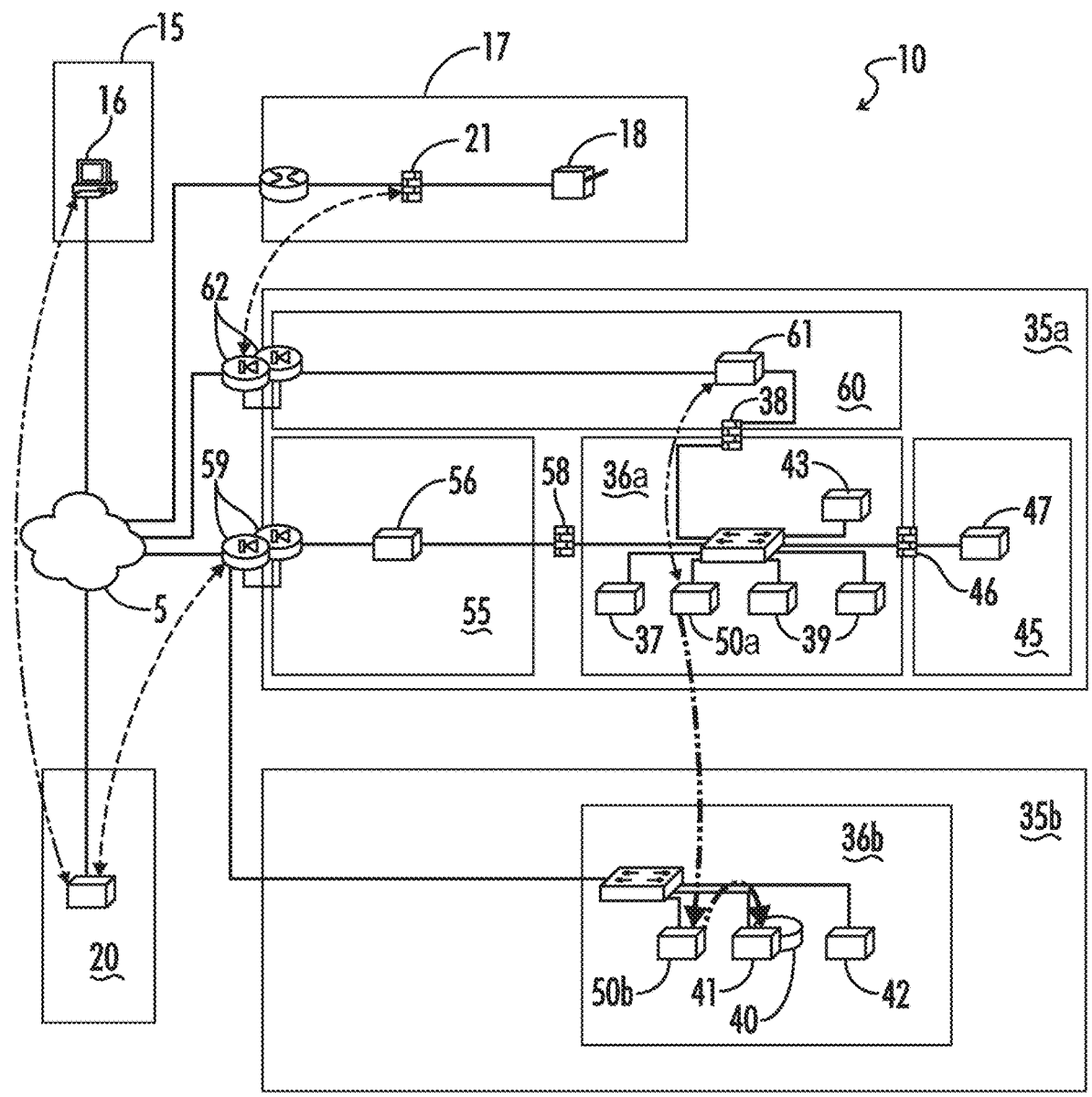
FIG. 3i is a block diagram of the system of FIG. 3a, further showing the application server proxying the card print request to the card services provider database and returning the results to the application server.
Figure 3J:
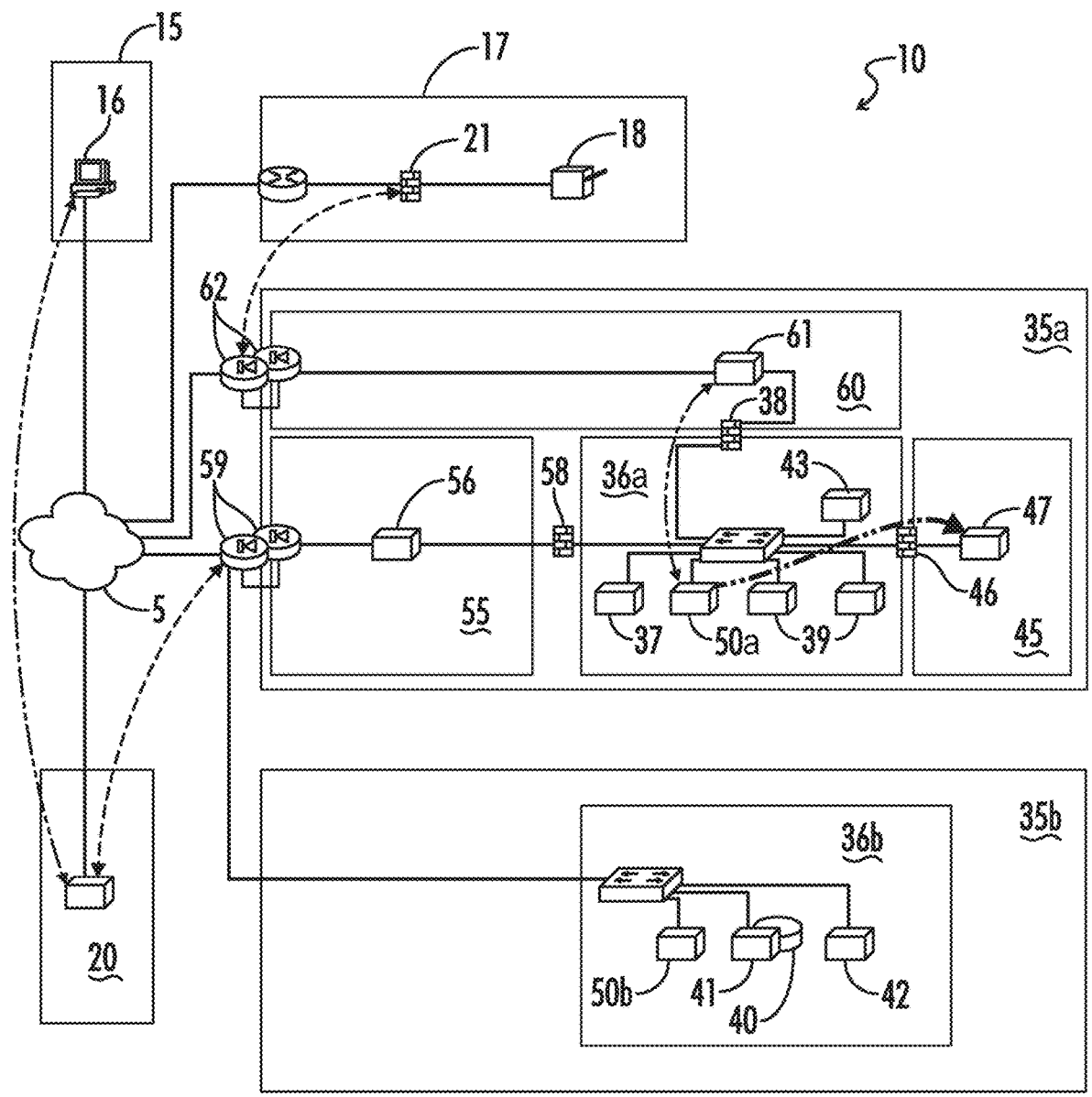
FIG. 3j is a block diagram of the system of FIG. 3a, further showing the application server communicating to the hardware security module, submitting the CVV Key Cryptogram(s) and card personalization data, and retrieving CV1 and CV2 values.
Figure 3K:
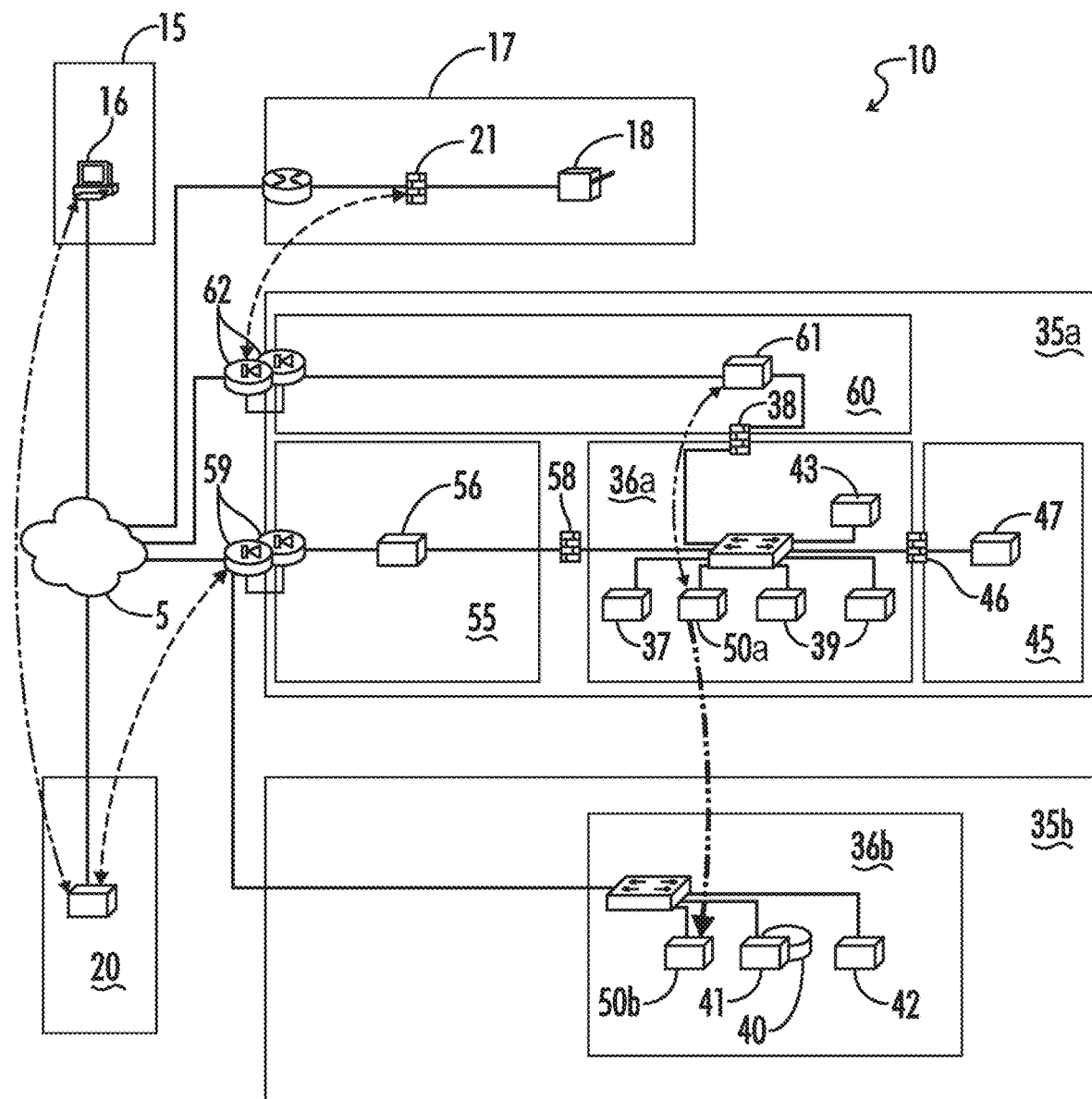
FIG. 3k is a block diagram of the system of FIG. 3a, further showing the PCI-compliant application server 50a contacting the application server 50b and requesting card image calculation information.
Figure 31:
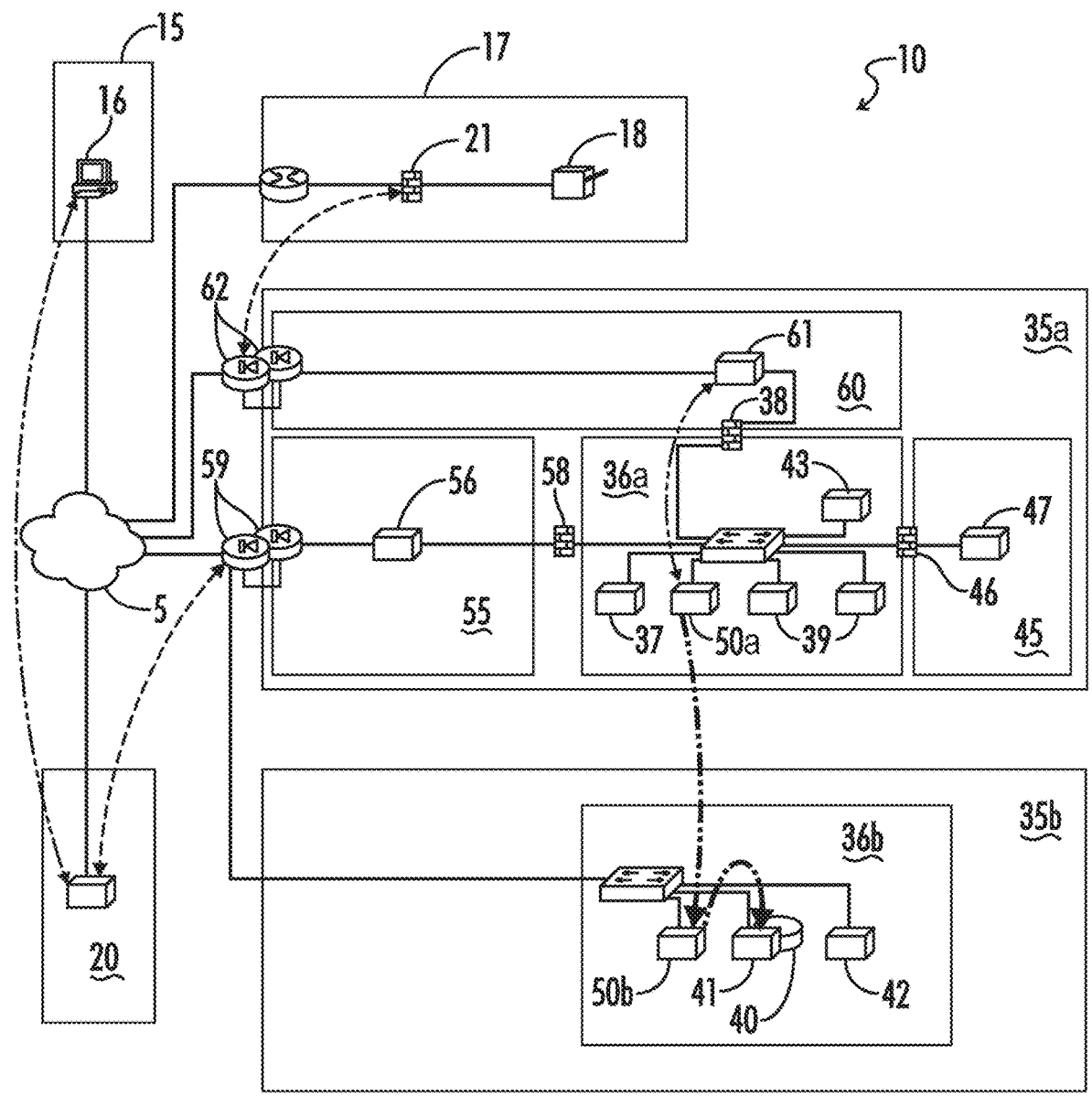
Figure 3M:
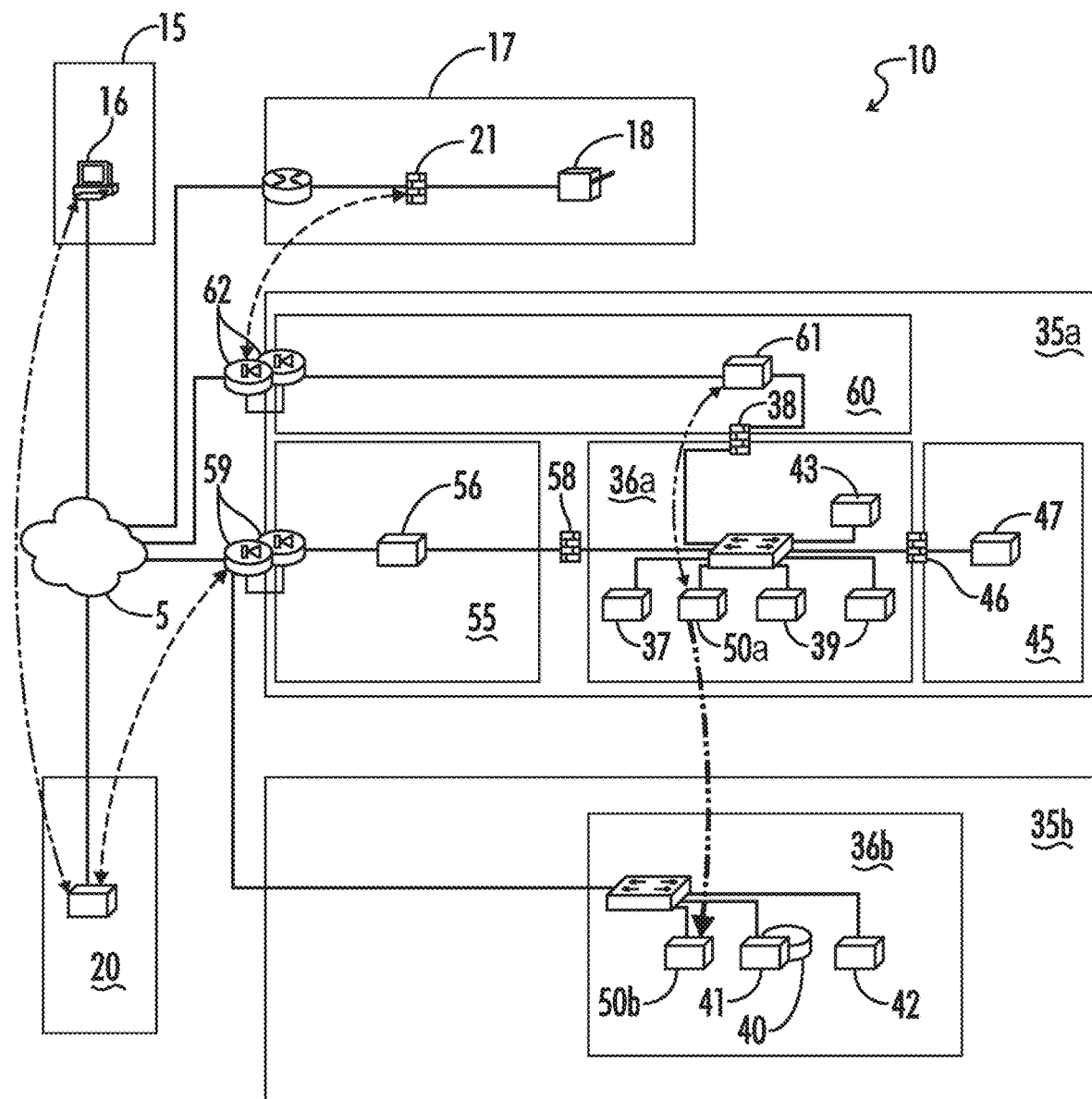
FIG. 3m is a block diagram of the system of FIG. 3a, further showing the application server 50a connecting to the application server 50b and requesting the card image data.
Figure 3N:
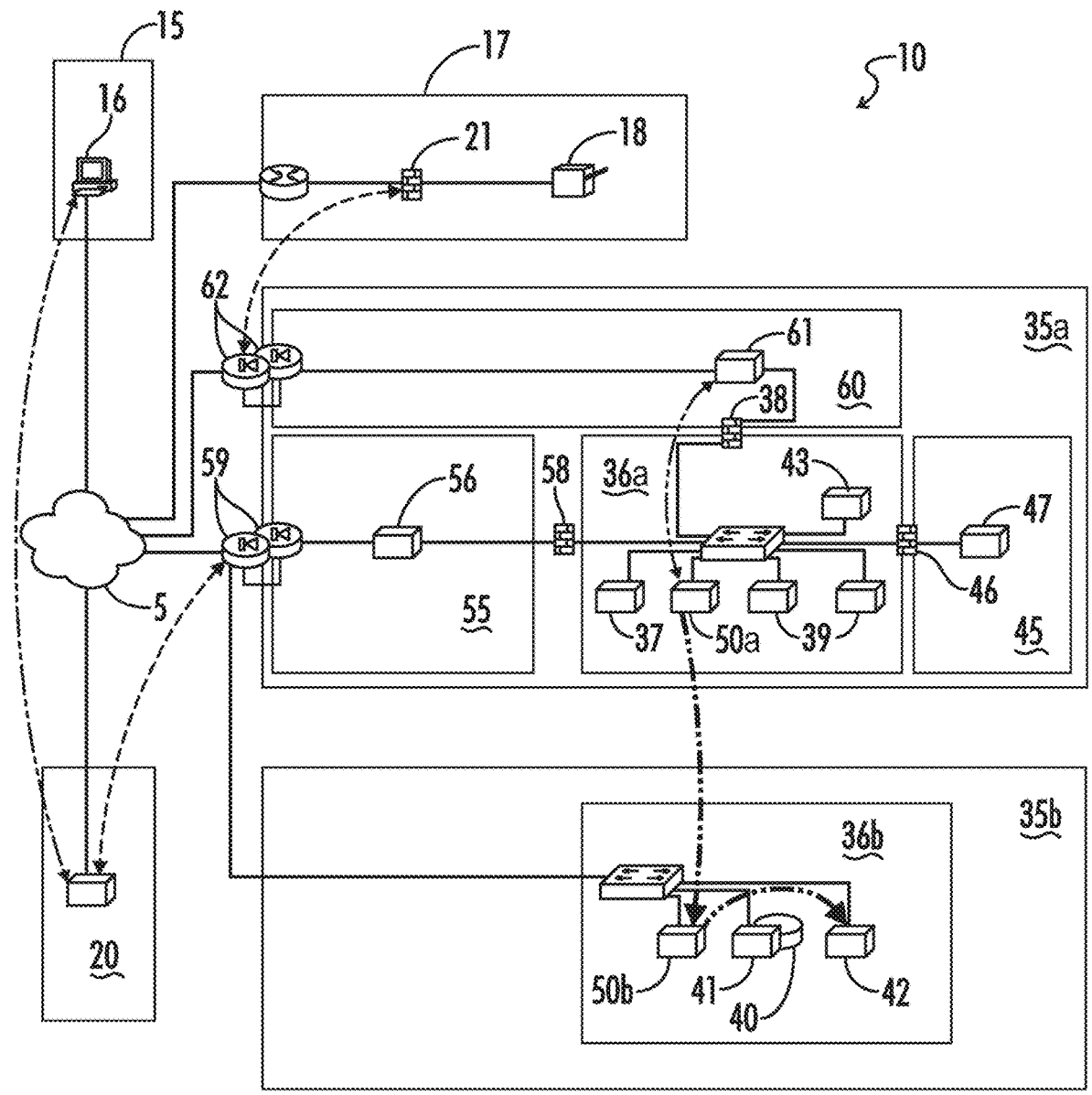
FIG. 3n is a block diagram of the system of FIG. 3a, further showing the application server 50b retrieving the card image data from the file server and transmitting it back over the HTTP request.
Figure 3O:
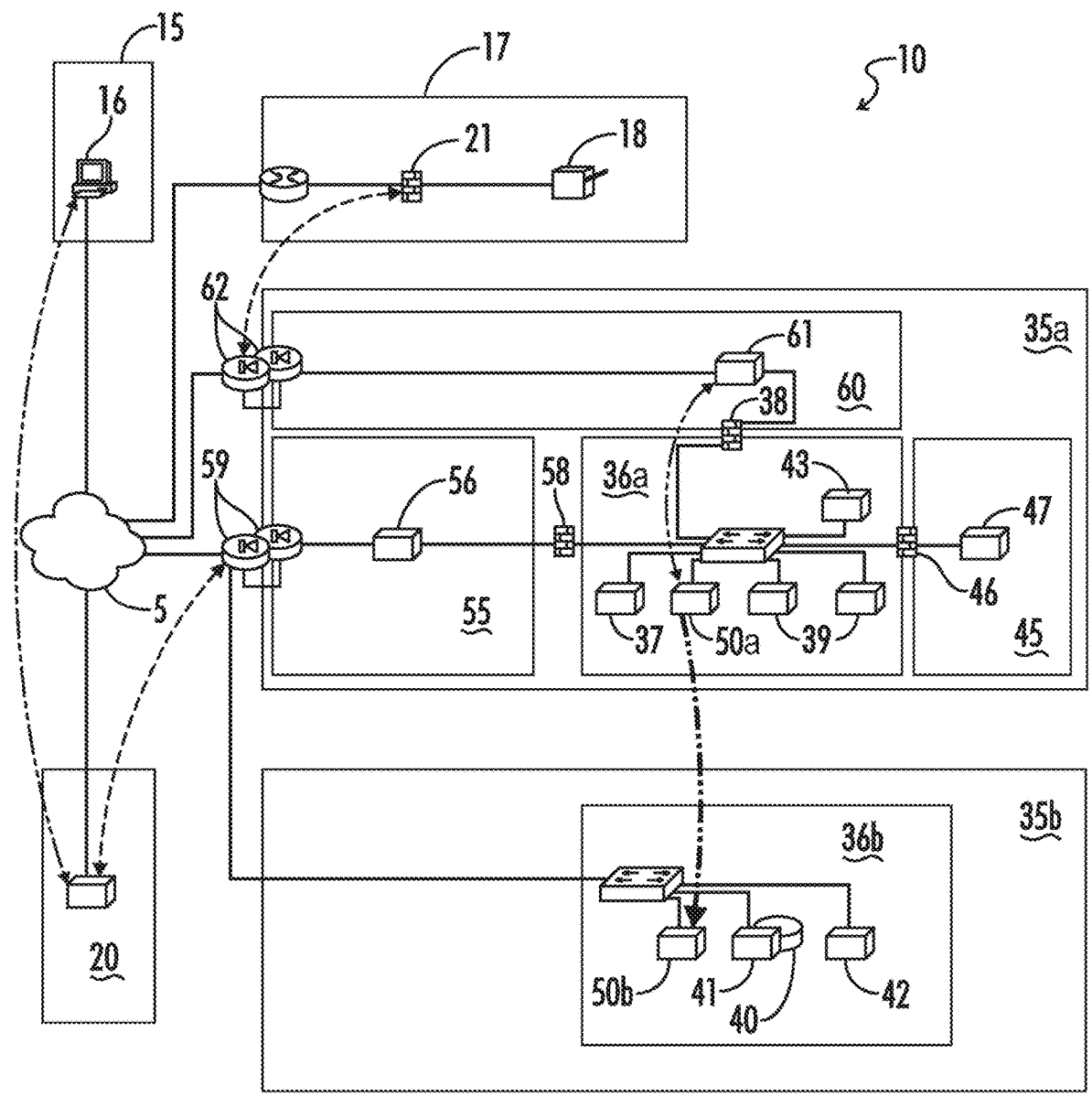
FIG. 3o is a block diagram of the system of FIG. 3a, further showing the application server 50a connecting to the application server 50b to retrieve card magnetic stripe calculation data.
Figure 3P:
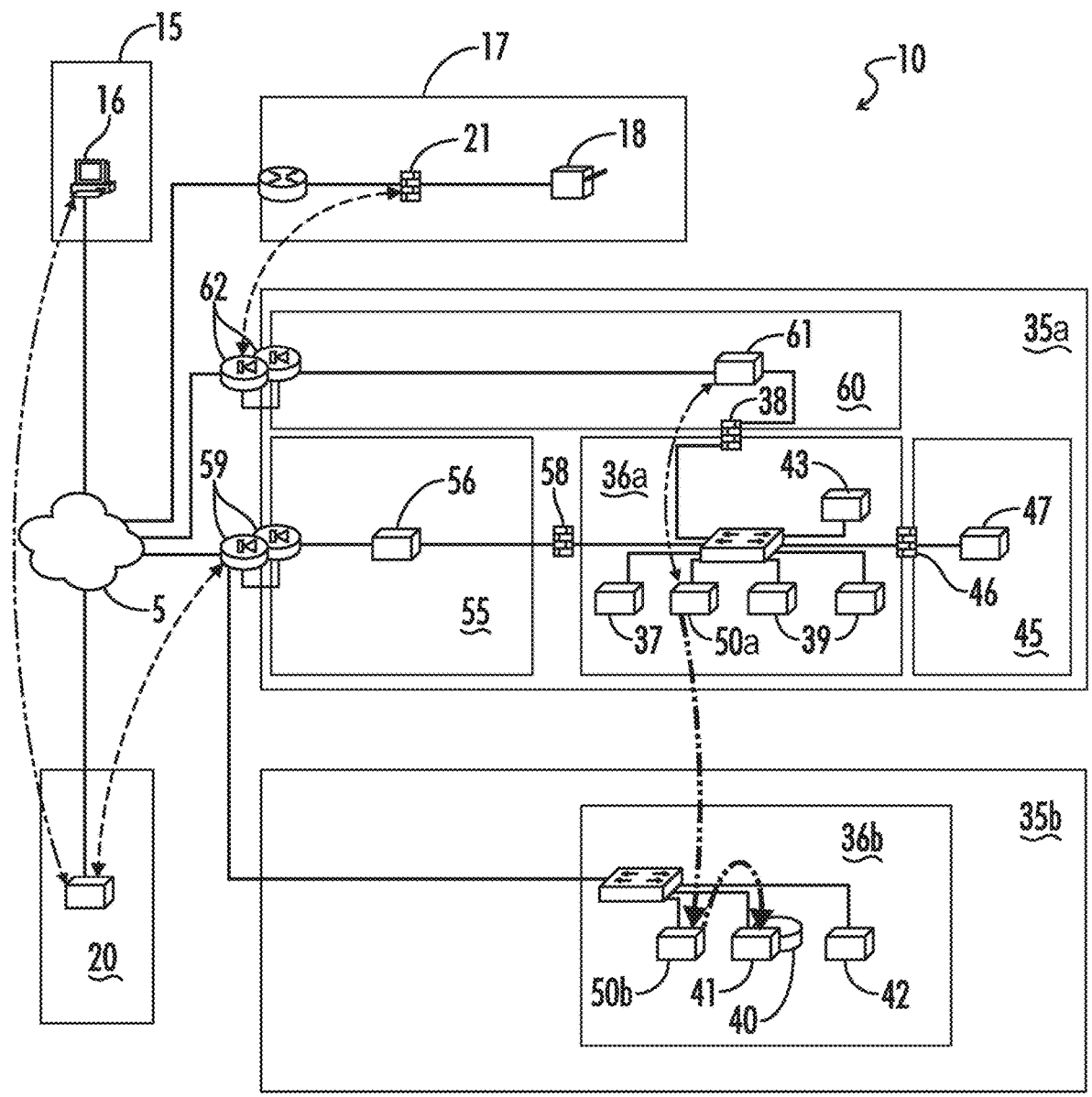
FIG. 3p is a block diagram of the system of FIG. 3a, further showing the application server 50b retrieving the magnetic stripe calculation data from the database and returning the results to the application server 50a over the HTTP response.
Figure 3Q:
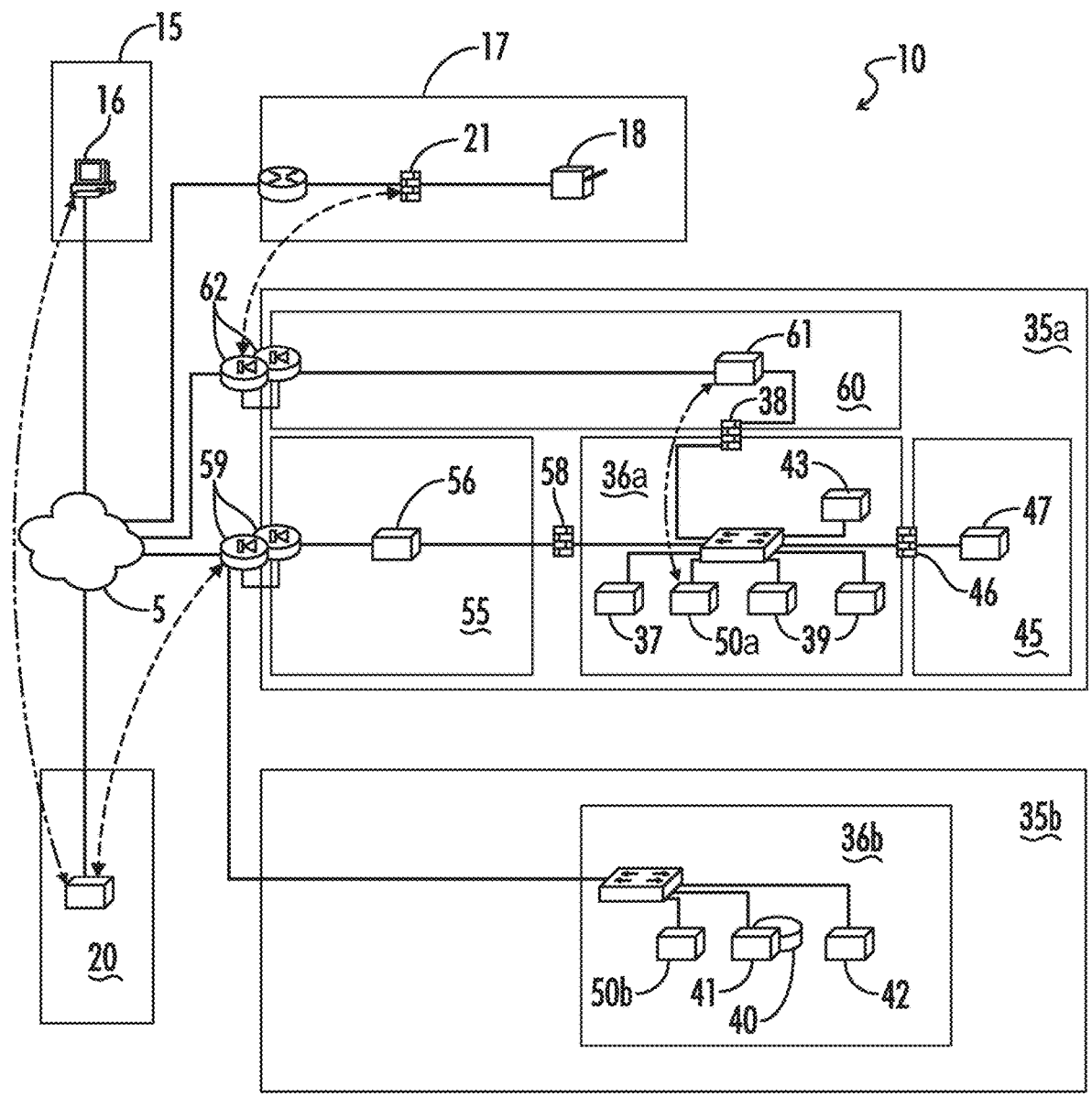
FIG. 3q is a block diagram of the system of FIG. 3a, further showing the application server 50a communicating the card print job on a print job message bus.
Figure 3R:
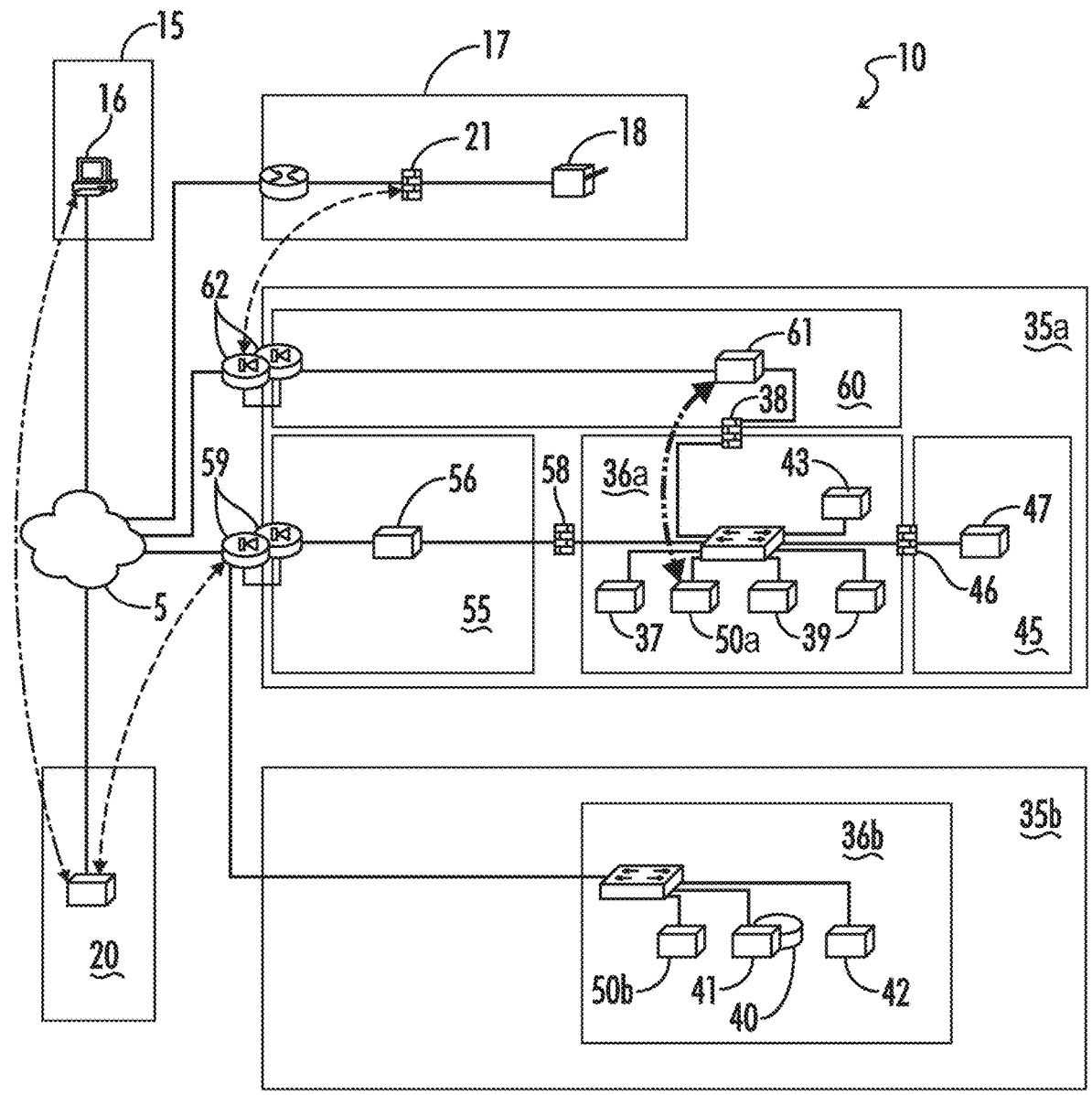
FIG. 3r is a block diagram of the system of FIG. 3a, further showing a connection broker assigning the print job to a worker thread on the print server.
Figure 3S:
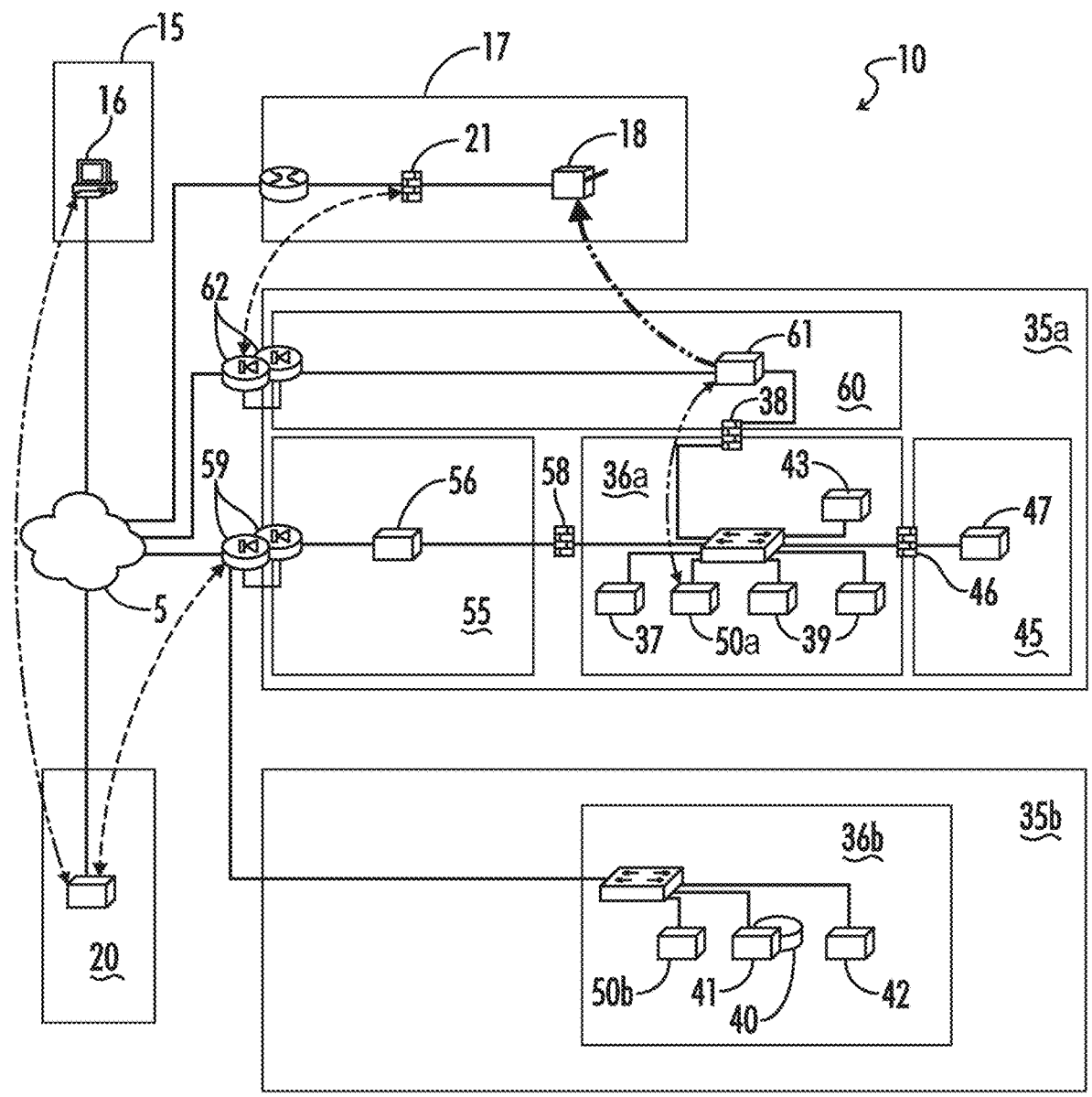
FIG. 3s is a block diagram of the system of FIG. 3a, further showing the print server sending the print job to the printer through the dynamic site-to-site VPN tunnel.
Figure 3T:
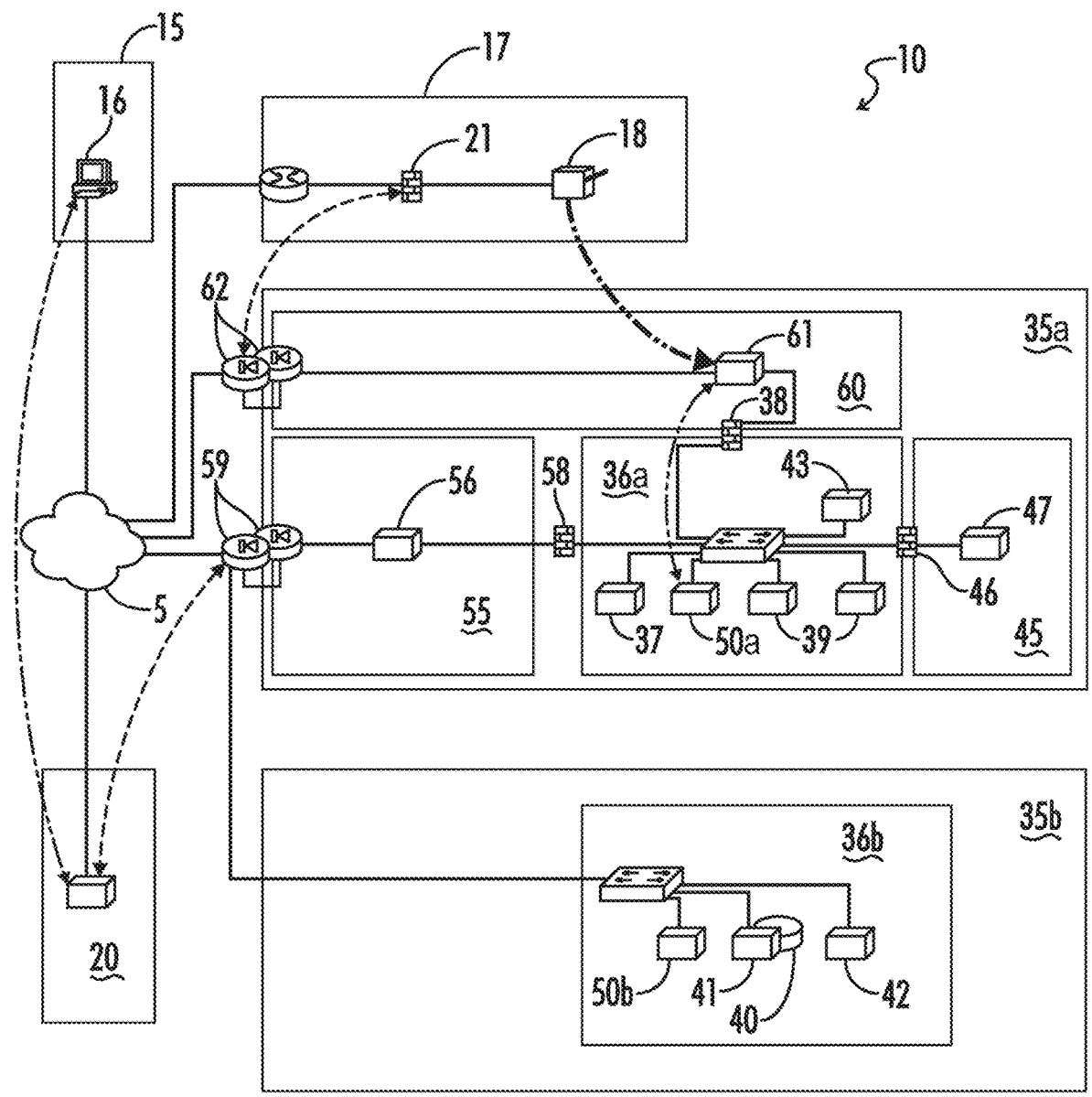
FIG. 3t is a block diagram of the system of FIG. 3a, further showing the printer attempting to print the card and sending a card print response message (success/failure/user intervention required) back to the print server.
Figure 3U:
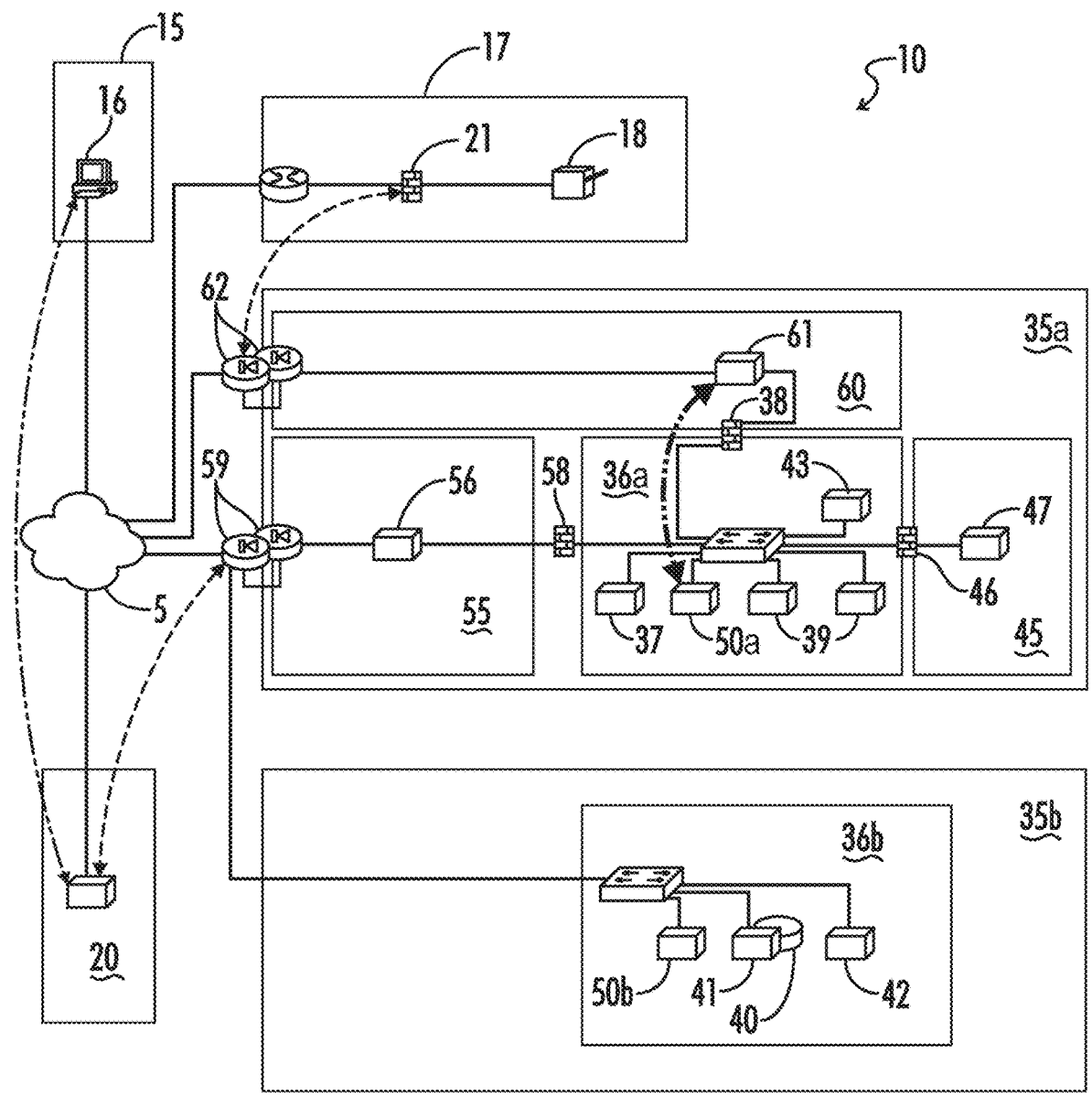
FIG. 3u is a block diagram of the system of FIG. 3a, further showing the worker thread placing the print result on the message bus.
Figure 3V:
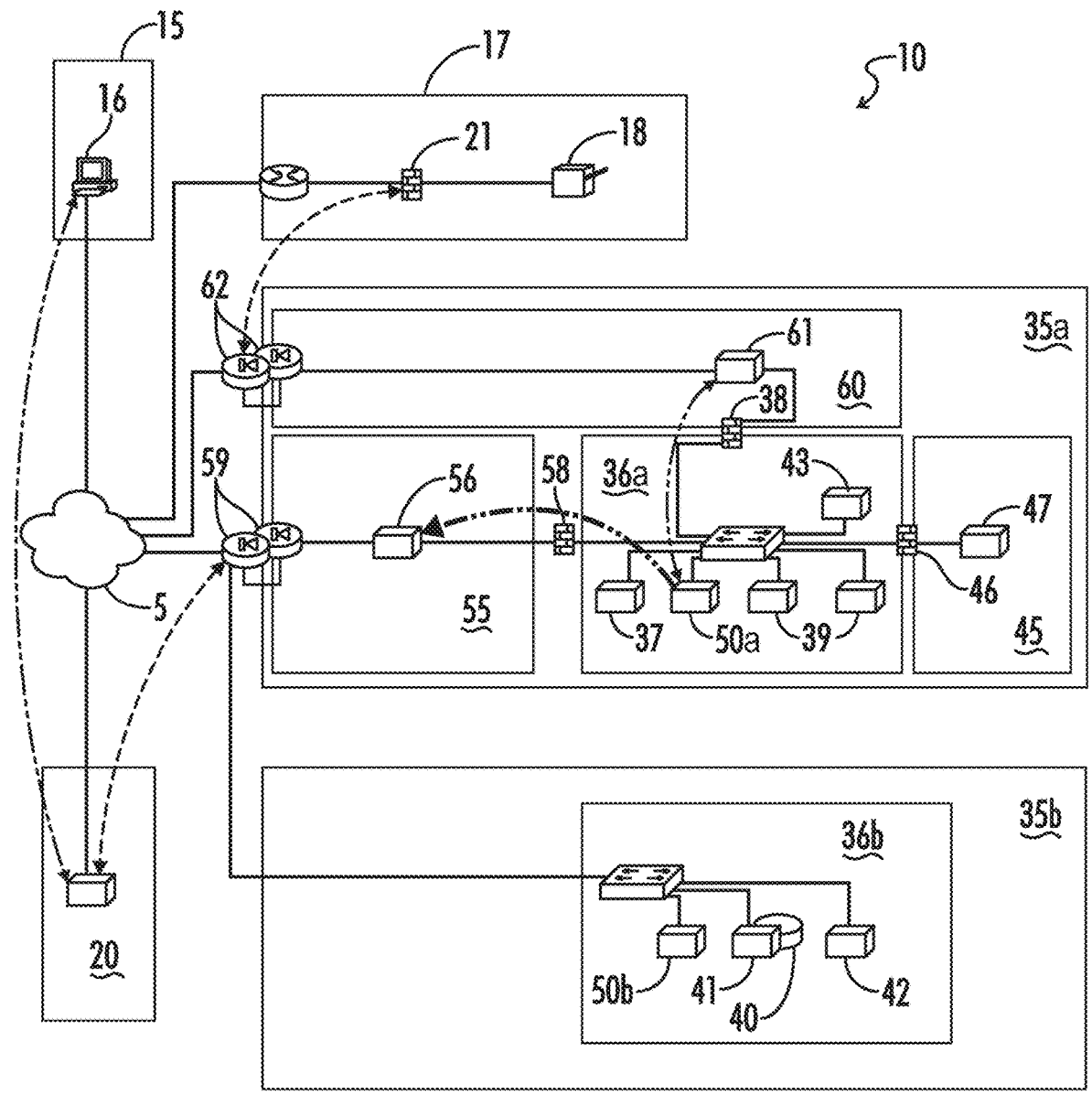
FIG. 3v is a block diagram of the system of FIG. 3a, further showing the application server sending the print result to the web service DMZ network via HTTP POST.
Figure 3W:
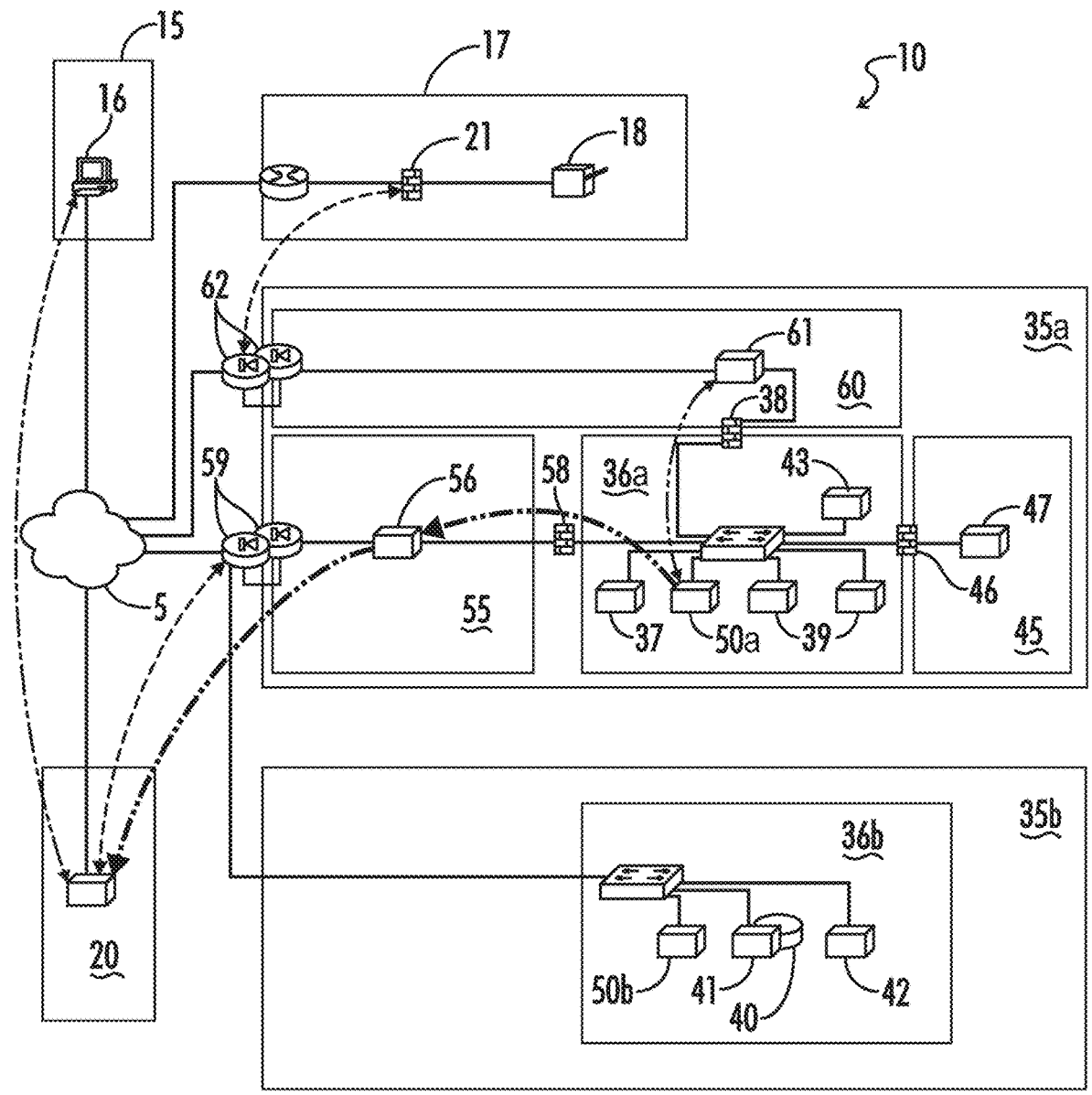
FIG. 3w is a block diagram of the system of FIG. 3a, further showing the proxy server in the card services provider web service relaying the card print result to the system web service.
Figure 3X:
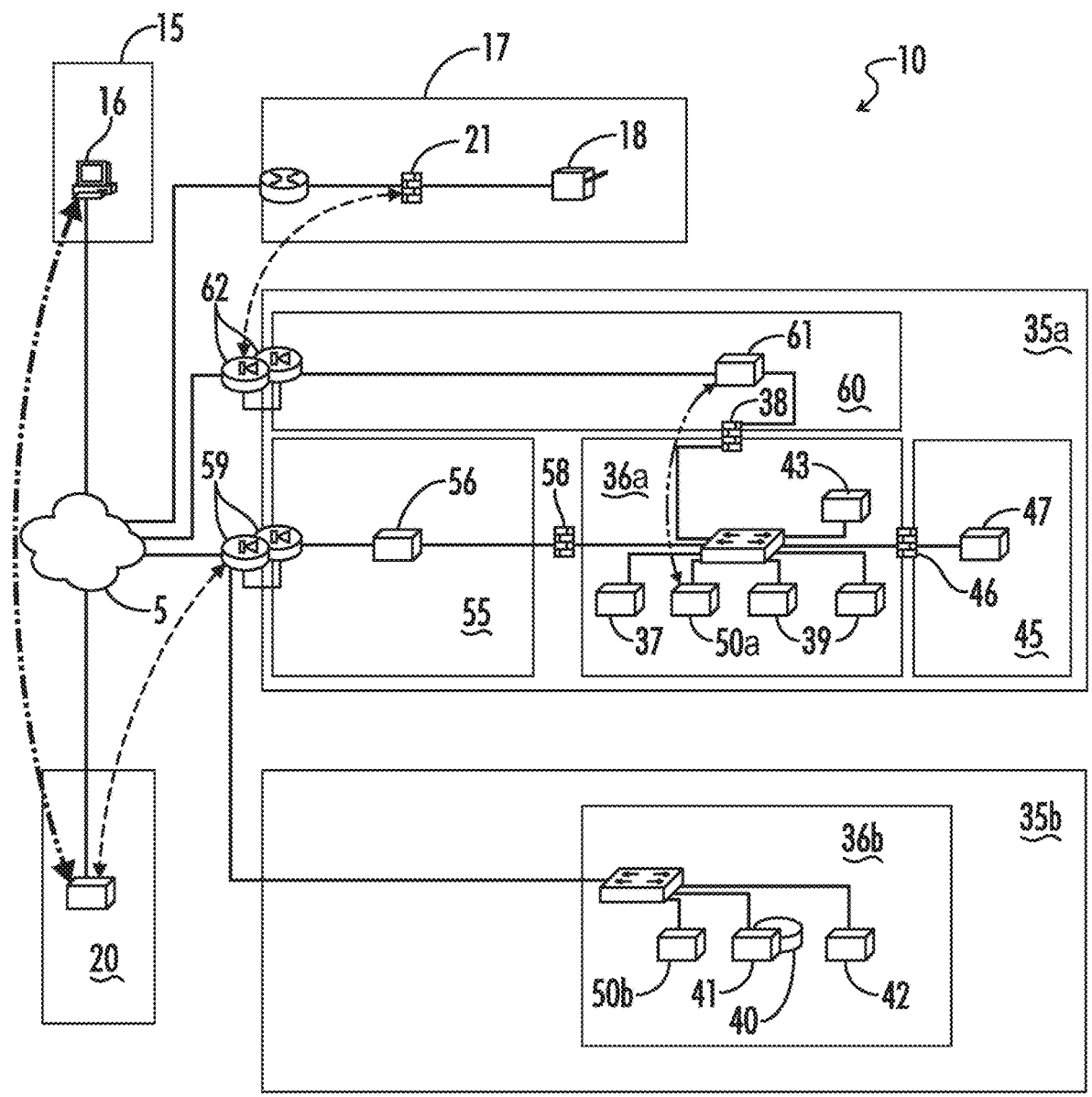
FIG. 3x is a block diagram of the system of FIG. 3a, further showing the system web service relaying the card print result to the requesting bank branch.

FIGS. 3a-3x illustrate sequential operation of this embodiment of system 10. In FIG. 3b, a site-to-site VPN link is established between the system web service 20 and the card services provider networks 35a and 35b. A dynamic site-to-site VPN tunnel is then created between printer appliance 21 and the print DMZ network 60, as shown in FIG. 3c. The print server 61 establishes a persistent connection to the application server 50a, as shown in FIG. 3d. In FIG. 3e, a bank branch issues a card instant issue request to the system web service 20. The system web service then sends an HTTP POST request to the web service DMZ network 55 (proxy server 56), as shown in FIG. 3f. The HTTP POST is proxied to the application server 50a and the HTTP status is returned to the web service 20, as shown in FIG. 3g.

The application server 50a requests a card CVV Key Cryptogram as known in the art from application server 50b (FIG. 3h). The application server 50b proxies this request to the card services provider database 40 and returns the results to the application server 50a (FIG. 3i). The application server 50a contacts the HSM 47 via HTTP (9090), submits the CVV Key Cryptogram(s) and card personalization data, and retrieves CV1 and CV2 values, again as known in the art (FIG. 3j).

The application server 50a contacts the application server 50b and requests card image calculation information (FIG. 3k). The application server 50b retrieves the image calculation information from the database 40 and returns the results (FIG. 3l). The application server 50a connects to application server 50b and requests the card image data (FIG. 3m). The application server 50b retrieves the card image data from the file server 42 and transmits it back over the HTTP request (FIG. 3n).

As shown in FIG. 3o, the application server 50a then connects to the application server 50b to retrieve card magnetic stripe calculation data. The application server 50b retrieves the magnetic stripe calculation data from the database 40 and returns the results to the application server 50a over the HTTP response (FIG. 3p).

Now having the card CV1 and CV2 values, the card personalization data, the card image information, the card image data, and the magnetic stripe data, the application server 50a communicates the card print job on a message bus (FIG. 3q). The connection broker then assigns the job to a worker thread on the print server 61 (FIG. 3r). The print server 61 sends the print job to the printer 18 through the dynamic site-to-site VPN tunnel (FIG. 3s). The printer 18 then attempts to print the card and sends a card print response message (success/failure/user intervention required) back to the print server 61 (FIG. 3t). The worker thread places the print result on the message bus (FIG. 3u). The application server 50a sends the print result to the web service DMZ network 55 (proxy server 56) via HTTP POST (FIG. 3v). The proxy server 56 relays the print result to the system web service 20 (FIG. 3w) which relays the result to the requesting branch 15 (FIG. 3x), completing the process. The system 10 is now ready for another card print request.

In the process described above, while many of the data retrieval steps are performed sequentially, this is not required. For example, some or all of the data needed from the servers as illustrated and described with reference to FIGS. 3h-3q can be retrieved concurrently in a single step.

Thus, although there have been described particular embodiments of the present invention of a new and useful system and method for instant issue of personalized financial transaction cards, it is not intended that such references be construed as limitations upon the scope of this invention except as set forth in the following claims.

What is claimed is:

1. A method for issuing a personalized financial transaction card from a financial institution to a customer in response to a customer request made from a branch location associated with the financial institution comprising:
  receiving customer information and card information from the customer at the branch location, the card information including a card personal identification number (PIN);
  inputting the customer information and at least some the card information into a data processing terminal at the branch;
  electronically communicating the customer information and the card information from the branch across a network to a card services provider;
  entering the PIN into a PIN database;
  generating a reference number associated with the customer and the selected PIN;
  storing the reference number and at least some of the customer data and card data in a card file associated with the customer;
  retrieving the PIN from the PIN database;
  using the retrieved PIN to apply calculations to the card file;
  securely sending the card file from the card services provider across the network to the branch location; and
  using information from the card file, printing the financial transaction card for the customer at the branch location;
  wherein each step of the method is performed while the customer is present at the branch location.

2. The method of claim 1 further comprising sending a verification message to the financial institution when the financial transaction card has been successfully printed.

3. The method of claim 1 further comprising sending an error message to the branch location when the financial transaction card did not successfully print.

4. The method of claim 1 wherein the card file is stored at the branch location and the step of storing the reference number and at least some of the customer data further comprises updating the card file with the reference number at the branch location.

5. The method of claim 4 further comprising:
  after the card file at the branch location is updated with the reference number, sending a card issue request from the branch location and receiving it in a hardware security module (HSM) at the card services provider; and in response to receiving the card issue request, using the HSM to retrieve the PIN from the PIN database and to apply the reference number to the calculations in the card file.

6. A system for instant issue of financial transaction cards in response to card requests made by customers at one or more branch locations associated with a financial institution, wherein the card requests include customer information associated with the customer and card information including a selected card personal identification number (PIN) to be associated with a financial transaction card, the system comprising:

a card services provider network;

at least one branch data terminal at each branch location, wherein the branch data terminal
- is effective to receive customer information and at least the PIN portion of card information associated with a card request,
- is functionally coupled via a secure data communications link to the card services provider network, and
- is effective to transmit the customer information and at least the PIN portion of the card information to the card services provider network via the secure data communications link, while the customers are present in the branch locations;

the card services provider network comprises
- a PIN database effective to receive and securely store PINs transmitted by the branch data terminal,
- PIN application software effective to generate a reference number associated with a card request using a PIN stored in the PIN database,
- card file application software effective to create an electronic card file associated with a card request and to update the card file using the reference number, and
- card print application software effective to securely transmit card print commands and card files associated with card requests while the customers are present at the branch locations; and a branch card printer network at each branch location, the branch card printer network comprising a card printer effective to print personalized financial transaction cards while the customers are present in the branch locations in response to receiving the print commands and card files transmitted by the card services provider network.

7. The system of claim 6 further comprising:

a system web service coupled to the branch data terminals and to the branch card printer networks;

a perimeter network coupled to the card services provider network; and wherein the branch data terminals and the branch card printer networks securely communicate with the card services provider network through the system web service and the perimeter network.

8. The system of claim 7 further comprising a virtual private network (VPN) functionally coupled to the perimeter network and to the card services provider network and wherein the VPN includes at least one security appliance and is effective to provide encrypted data communications between the system web service and the perimeter network.

9. The system of claim 8 wherein the card services provider network includes a hardware-host security module (HSM) effective to provide a secure functional environment for the PIN application software and the card file application software.

10. The system of claim 9 wherein the branch card printer network at each branch location further comprises a security appliance functionally coupled to the card printer.

11. The system of claim 9 wherein the branch card printer network at each branch location is effective to electronically communicate card print job verification messages to at least one of the financial institution and a card transaction processor, the print job verification message thereby confirming that financial transaction cards printed at the branch location in response to receiving print commands are ready for use by the customers.

12. The system of claim 11 wherein:

the card services provider network further comprises a card services provider print server hosting the card print application software;

the branch card printer network at each branch location is effective to electronically communicate card print job success and failure messages to the card services provider print server; and the card services provider network is further effective to communicate card print success and failure information to the branch data terminal at the branch location from which a corresponding card print job success or failure message was communicated to the card services provider print server.

13. A system for processing of a card request made by a customer at a branch location associated with a financial institution, wherein the card request includes customer information, card information including a selected card personal identification number (PIN), and a requirement that the card be instantly issued while the customer is present in the branch location, the system comprising:

a first card services provider network comprising:
- an instant issue server network including a first application server,
- an instant issue card personalization network coupled to the instant issue server network,
- an instant issue web service perimeter network coupled to the instant issue server network, and
- an instant issue print perimeter network coupled to the instant issue server network, the instant issue print perimeter network including a print server coupled to a first firewall;

a second card services provider network comprising:
- a second application server,
- a file server,
- a database server, and
- a database coupled to the database server, the instant issue web service perimeter network and the second card services provider network are each coupled to a second firewall;

the instant issue web service perimeter network is effective to receive a card request from the branch location and to communicate the card request to the first application server;

in response to receiving a card request from the branch location via the instant issue web service perimeter network, the first application server is effective to communicate card data requests to the second application server;

the database server is effective to securely store a PIN associated with a card request in the database;

in response to receiving a card data request, the second application server, the database server and the file server are effective to communicate card cryptographic data, card image information, card image data, and card magnetic stripe data to the first application server;

in response to receiving the card cryptographic data, the first application server is effective to communicate the card cryptographic data to the instant issue card personalization network and to retrieve card security data from the instant issue card personalization network;

in response to receiving the card image information, the card image data, the card magnetic stripe data, and the card security data, the first application server is effective to communicate a card print job to the print server;

in response to receiving a card print job, the print server is effective to transmit the card print job to the branch location via the first firewall.

14. The system of claim 13 further comprising:

a first security appliance coupling the instant issue server network to the instant issue print perimeter network;

a second security appliance coupling the instant issue card personalization network to the instant issue server network; and a third security appliance coupling the instant issue server network to the instant issue web service perimeter network.

15. The system of claim 14 wherein the instant issue card personalization network comprises a hardware-host security module.

16. The method of claim 1 wherein the network is a perimeter network, and the method further comprises:

electronically communicating the customer information and the card information from a branch network across the perimeter network to a card services provider network; and securely sending the card file from the card services provider network across the perimeter network to the branch network;

wherein the perimeter network is configured to block access to parts of the card services provider network and the branch network.

17. The method of claim 16 further comprising encrypting, via a virtual private network (VPN) functionally coupled to the perimeter network and to the card services provider network, data communications of the card file.

18. The system of claim 13 wherein the branch location includes a branch card printer network effective to receive the card print job from the print server and electronically communicate card print job verification messages to at least one of the financial institution and a card transaction processor.

19. The system of claim 13 wherein the second card services provider network further comprises:

PIN application software effective to generate a reference number associated with the card request using the PIN stored in the database server; and card file application software effective to create an electronic card file associated with the card request and to update the card file using the reference number;

wherein the print server includes card print application software effective to securely transmit the card print job and the card file while the customer is present at the branch location.

20. The system of claim 13 wherein:

the print server hosting a card print application software effective to securely transmit the card print job and card files associated with the card requests while the customer is present at the branch location;

the branch location includes a branch card printer network effective to:

receive the card print job and card files from the print server, electronically communicate card print job success and failure messages to the print server; and the instant issue print perimeter network is further effective to communicate the card print success and failure messages to the branch location.

* * * * *